United States Patent [19]
Green et al.

[11] Patent Number: 5,959,739
[45] Date of Patent: Sep. 28, 1999

[54] SYSTEM FOR DISTINGUISHING TRUE TARGET REFLECTIONS FROM GHOST TARGET REFLECTIONS

[75] Inventors: Francisco Roberto Green; Philip Lynn Detweiler, both of Tipp City, Ohio

[73] Assignee: Spectra Precision, Inc., Dayton, Ohio

[21] Appl. No.: 09/022,506

[22] Filed: Feb. 12, 1998

[51] Int. Cl.[6] .................................................. G01N 21/55
[52] U.S. Cl. ........................................................... 356/445
[58] Field of Search ................................. 356/445, 119.1, 356/153, 248, 249, 250; 350/16; 33/374, 381–384

[56] References Cited

U.S. PATENT DOCUMENTS

| | | | |
|---|---|---|---|
| 3,936,197 | 2/1976 | Aldrink et al. | 356/280 |
| 4,062,634 | 12/1977 | Rando et al. | 356/248 |
| 4,221,483 | 9/1980 | Rando | 356/250 |
| 4,662,707 | 5/1987 | Teach et al. | 359/198 |
| 4,895,440 | 1/1990 | Cain et al. | 356/5.08 |
| 5,144,486 | 9/1992 | Hart | 356/138 |
| 5,257,279 | 10/1993 | Dugan et al. | 356/153 |
| 5,375,663 | 12/1994 | Teach | 356/375 |
| 5,513,001 | 4/1996 | Ohtomo et al. | 356/249 |
| 5,517,023 | 5/1996 | Ohtomo et al. | 250/234 |
| 5,844,679 | 12/1998 | Detweiler et al. | 356/248 |

FOREIGN PATENT DOCUMENTS

| | | |
|---|---|---|
| 0 643 283 A1 | 3/1995 | European Pat. Off. . |
| 6-201383 | 7/1994 | Japan . |

Primary Examiner—Frank G. Font
Assistant Examiner—Michael P. Stafira
Attorney, Agent, or Firm—Killworth, Gottman, Hagan & Schaeff, LLP

[57] ABSTRACT

A system for distinguishing real target reflections from ghost target reflections for use in adjusting the orientation of a plane defined by a rotating laser beam from a laser transmitter is provided. One or more retroreflective targets are positioned in desired locations along a rotational arc to define the desired plane through which the laser beam is rotated. The laser beam rotates back and forth scanning for targets positioned along the rotational arc. The laser beam is reflected from the targets to the laser transmitter for processing. A plurality of detection zones are established within the rotational arc. The detection zones are associated with a direction of rotation of the laser beam so that the laser beam traverses a target prior to traversing a potential shiny surface which could cause a ghost target reflection. As the laser beam scans a target prior to a shiny surface, reflections received after a target reflection are ignored as being potentially invalid reflections. Once a true target reflection is received, the orientation of the laser beam is adjusted until the laser beam traverses the center of the target.

66 Claims, 11 Drawing Sheets

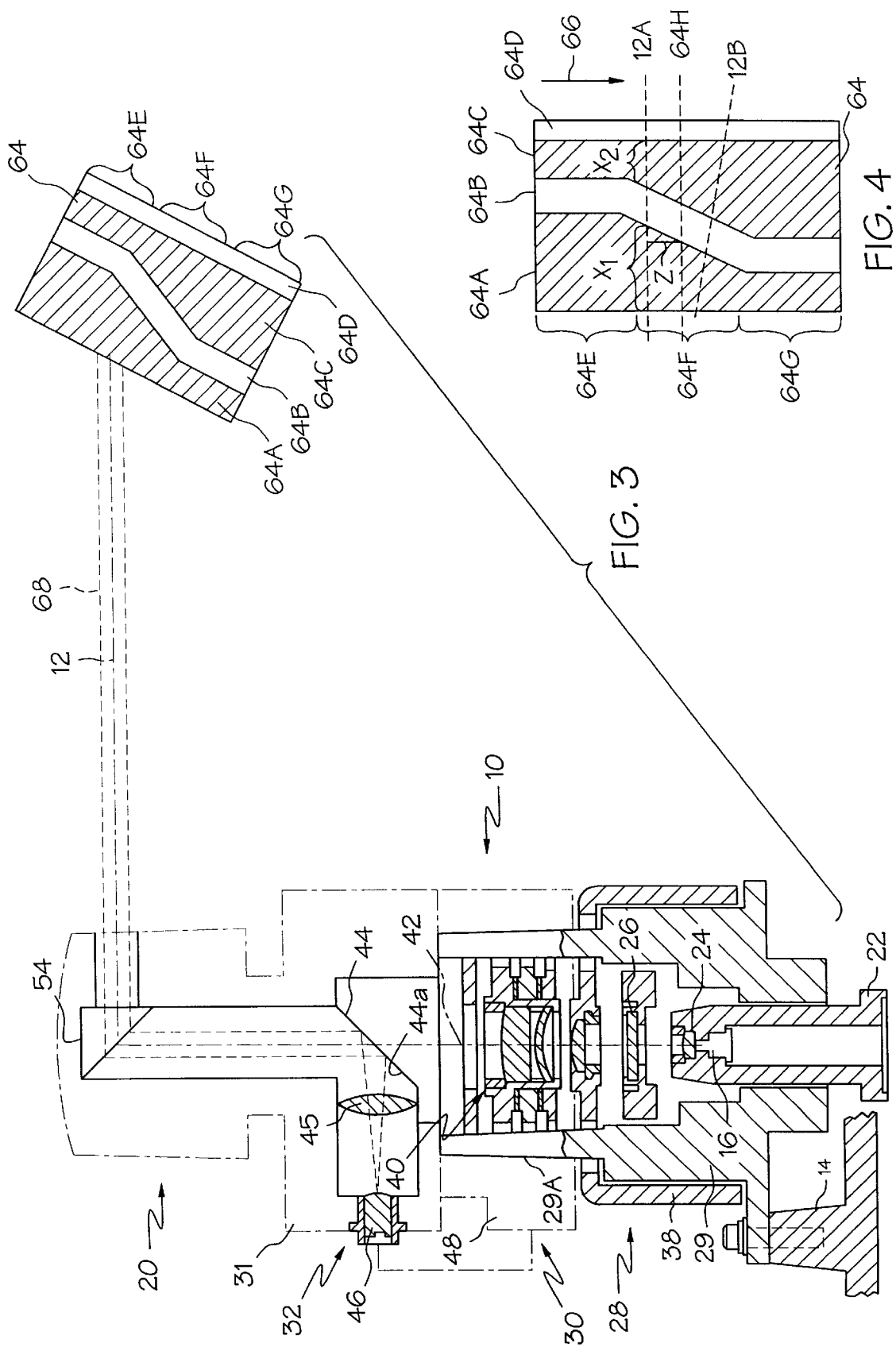

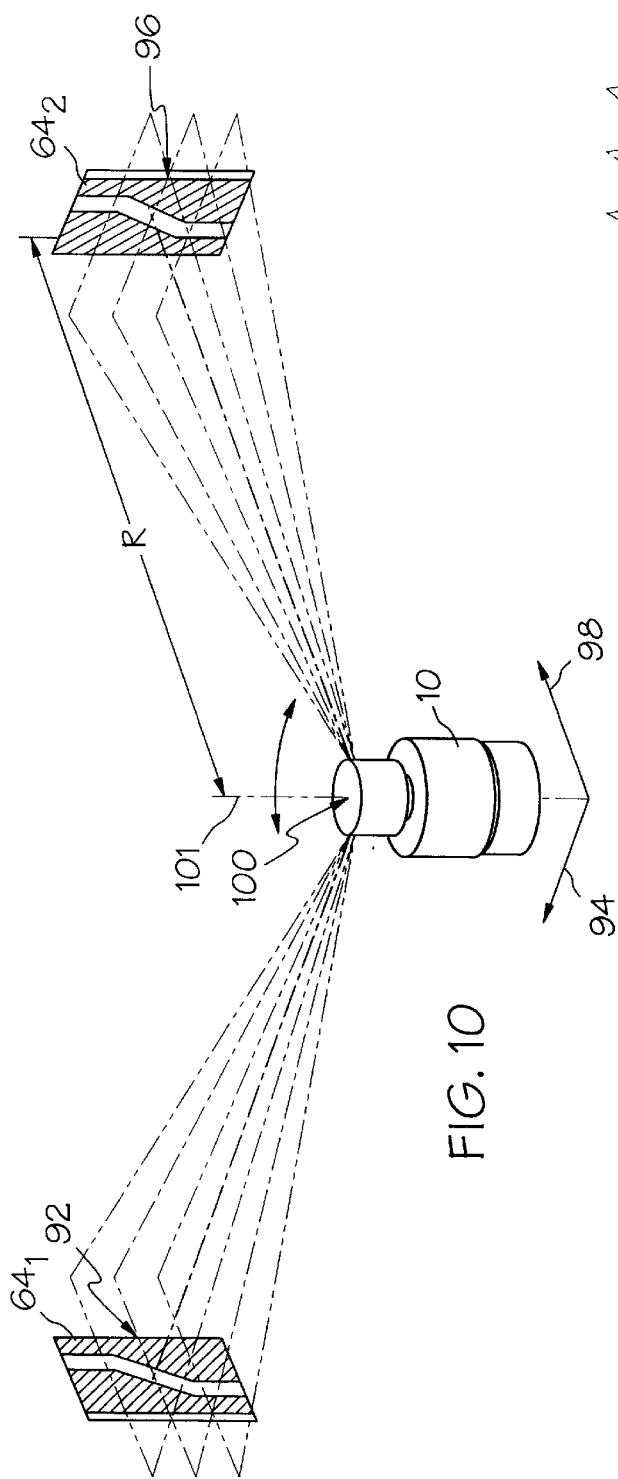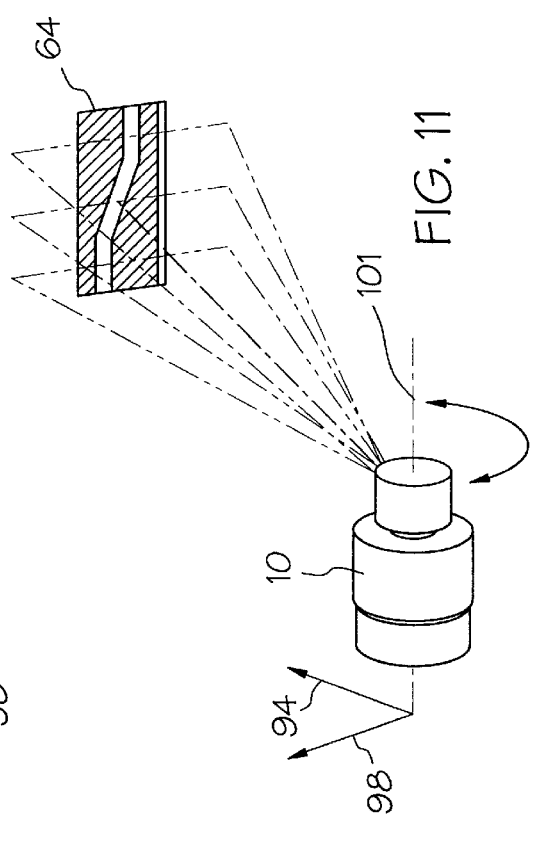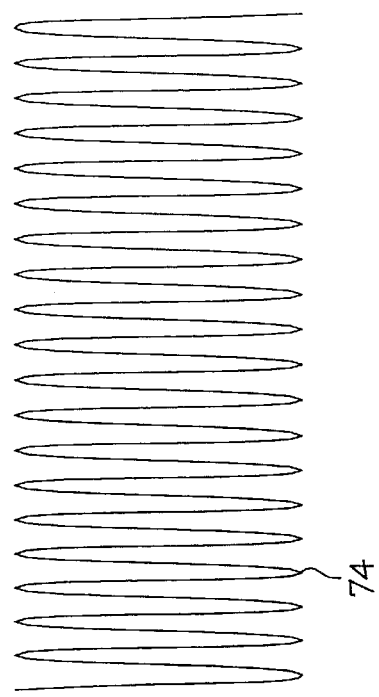

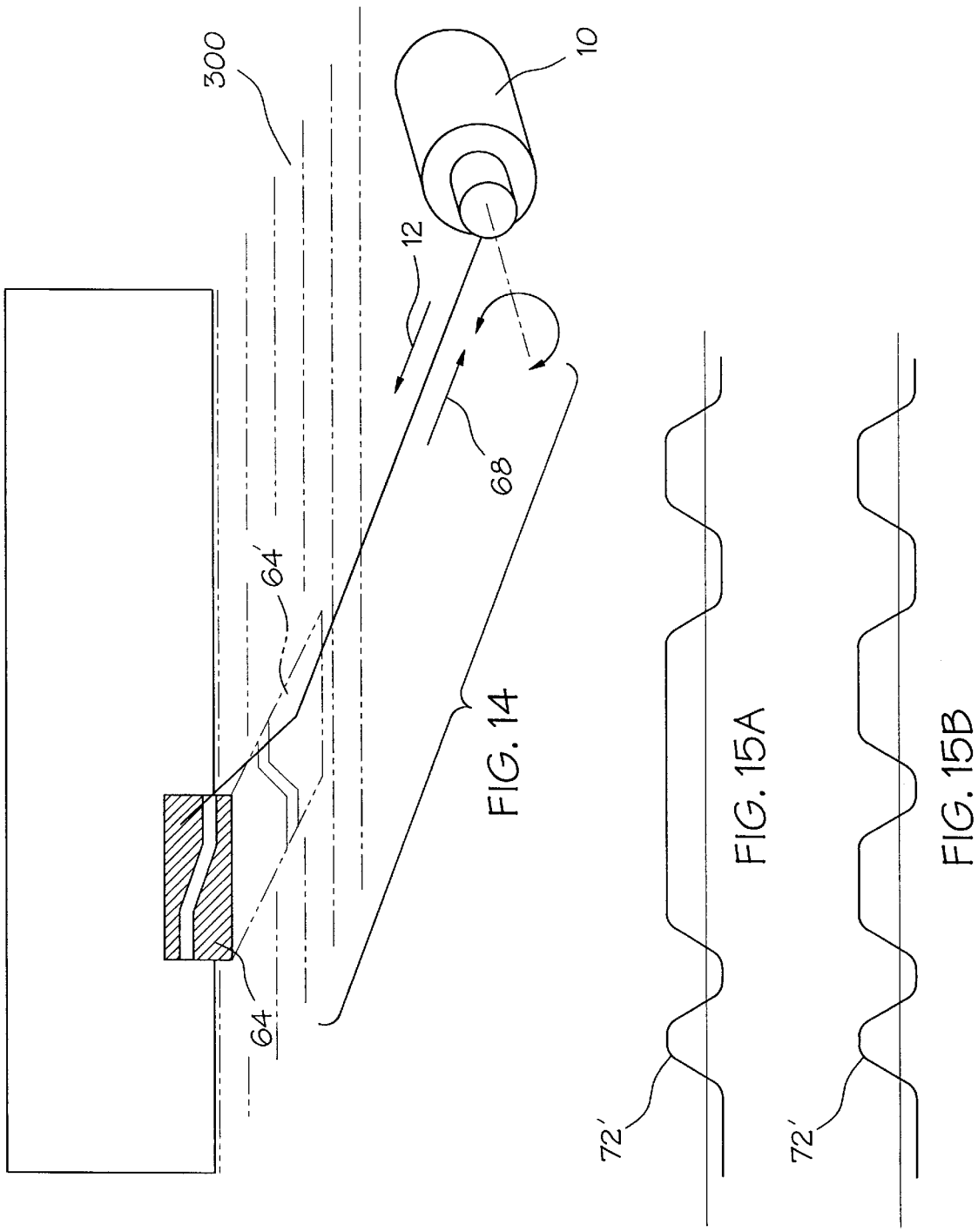

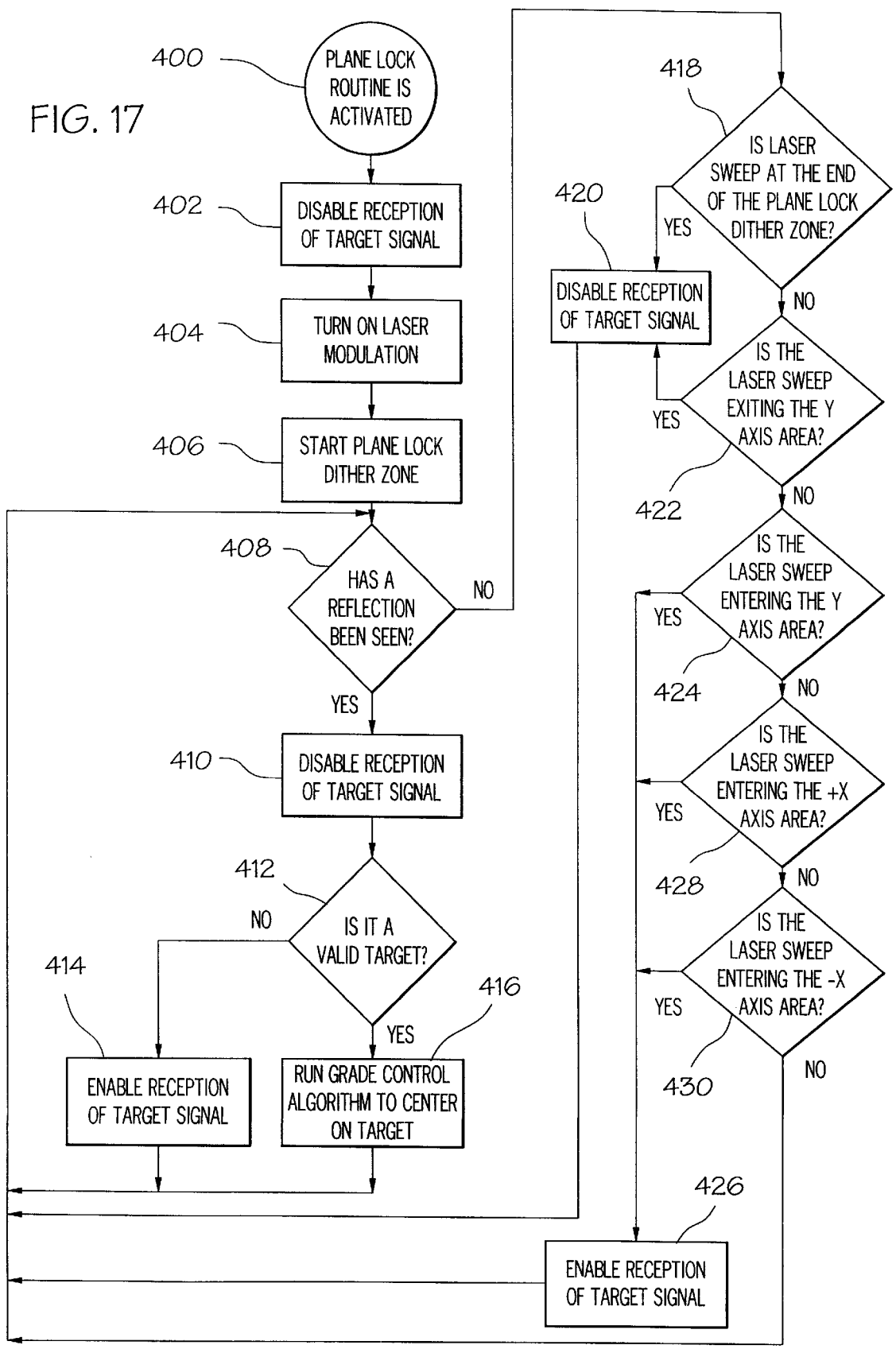

SYSTEM FOR DISTINGUISHING TRUE TARGET REFLECTIONS FROM GHOST TARGET REFLECTIONS

CROSS-REFERENCES TO RELATED APPLICATIONS

This application is related to commonly assigned U.S. patent application Ser. No. 08/833,978 and now U.S. Pat. No. 5,844,679, SYSTEM FOR ADJUSTING THE ORIENTATION OF A PLANE OF LASER LIGHT, filed Apr. 11, 1997, by Detweiler et al., the disclosure of which is incorporated herein by reference.

BACKGROUND OF THE INVENTION

The present invention relates in general to a laser transmitter, and, more particularly, to a system for distinguishing true target reflections from ghost target reflections so as to adjust the orientation of a plane of laser light as defined by the true target reflections.

Laser light systems have been employed in numerous surveying and construction applications. In one such system, a laser light transmitting device provides a rotating laser beam which establishes a reference plane. Typically, the rotating laser beam is used to provide a continuous plane of light that creates either a constant horizontal bench mark of elevation or a selected plane over an entire work area. The laser light is either detected by the naked eye or by one or more laser beam detectors, placed at considerable distances from the transmitting device. Various construction tasks are performed based on the visual perception of the laser light, while the detectors are used to intercept the rotating laser beam and determine a proper elevation and grade at selected points throughout the work area.

In the laser light transmitting device, the plane of light is produced by projecting the beam generally upward and then deflecting the beam ninety degrees within a pentaprism or penta-mirror assembly. The pentaprism assembly is rotated about a vertical axis within the transmitting device to cause the beam to rotate and define the reference plane. The laser transmitting device may be adjusted so that the orientation of the rotating beam of light defines a desired plane with respect to a generally horizontal or vertical plane.

Retroreflective targets may be positioned at desired locations to define the desired plane through which the beam of light is rotated. The beam of light is reflected from the retroreflective targets and transmitted back to the transmitting device. The transmitting device determines the location of the retroreflective targets and adjusts the orientation of the rotating beam of light in response to the light reflected from the retroreflective targets. However, reflective surfaces adjacent to the retroreflective targets, such as shiny floors or glossy walls, tend to create a ghost or mirror image of the retroreflective targets. These ghosts images may confuse the transmitting device thereby affecting the accuracy of the adjustments necessary to align the rotating laser beam so that it is oriented in the desired plane.

Accordingly, there is a need in the art for an automatic and accurate system for distinguishing true target reflections from ghost target reflections so as to enable the orientation of a plane of laser light to be adjusted accurately based on the true target reflections. Preferably, such a system would be inexpensive and easy to operate.

SUMMARY OF THE INVENTION

The present invention meets the aforementioned needs by providing a laser transmitter which projects a beam of laser light that is rotated about a central rotational axis so as to define a reference plane of light. The beam of laser light is projected towards one or more aligning targets which are positioned so as to define the desired reference plane. Light is reflected from the targets back to the laser transmitter for detection by a photodetecting system. The photodetecting system scans for targets in predetermined detection zones. The photodetecting system only detects reflections associated with targets in the predetermined detection zones. The beam of laser light is rotated back and forth with each of the predetermined detection zones being associated with one direction or the other. The photodetecting system is configured to detect reflections from targets in each of the predetermined detection zones as long as the laser beam is also rotating in the corresponding associated direction so as to distinguish further between true target reflections and ghost target reflections. Once true target reflections are scanned and detected, the orientation of the laser beam is adjusted so that it defines the desired reference plane of light.

According to a first aspect of the present invention, a process for transmitting a laser beam is provided. The laser beam is moved in at least a first angular direction along a rotational arc defined about a central rotational axis. A rotary position of the laser beam is monitored relative to the rotational arc. At least a first detection zone is established along the rotational arc based on the rotary position of the laser beam as the laser beam moves in the first angular direction. The first detection zone is less than 90 degrees. A reflected laser beam is detected from at least a first target positioned within the rotational arc and in the first detection zone as the laser beam is moved in the first angular direction.

Preferably, the rotational arc is greater than 180 degrees and less than 360 degrees and centered about a reference axis which is substantially perpendicular to the central rotational axis. The first target may comprise a plurality of reflective sections and a plurality of non-reflective sections with respective ones of the plurality of reflective sections alternating in position with respective ones of the plurality of non-reflective sections. Preferably, one of the plurality of non-reflective sections is positioned so that the one non-reflective section is traversed last by the laser beam as the laser beam moves in the first angular direction. The first target may comprise a first reflective section, a second reflective section, a first non-reflective section and a second non-reflective section with the first and second reflective sections alternating in position with the first and second non-reflective sections, respectively. The second non-reflective section forms an edge of the first target and the first non-reflective section includes a portion which slopes across the first and second reflective sections. The process may further comprise the step of determining whether the reflected laser beam corresponds to a valid target. The process may further comprise the step of ignoring the reflected laser beam after the laser beam is reflected by the first target.

According to another aspect of the present invention, a process for transmitting a laser beam is provided. The laser beam is moved back and forth in a first angular direction and a second angular direction along a rotational arc defined about a central rotational axis. A rotary position of the laser beam is monitored relative to the rotational arc. A plurality of detection zones are established along the rotational arc based on the rotary position of the laser beam with each of the detection zones being less than 90 degrees. A reflected laser beam is detected from at least a first target positioned within the rotational arc and in one of the plurality of detection zones. The plurality of detection zones includes at least a first detection zone and at least a second detection zone. The reflected laser beam is detected from the first target positioned in the first detection zone only when the laser beam is moved in the first angular direction and the reflected laser beam is detected from the first target positioned in the second detection zone only when the laser beam is moved in the second angular direction.

The process may further comprise the step of detecting the reflected laser beam from a second target positioned within the rotational arc and in another of the plurality of detection zones. The plurality of detection zones may include a third detection zone with the reflected laser beam being detected from the first target positioned in the third detection zone only when the laser beam is moved in the first angular direction. The plurality of detection zones may further include a fourth detection zone with the reflected laser beam being detected from the first target positioned in the fourth detection zone only when the laser beam is moved in the second angular direction.

Preferably, at least one of the first and third detection zones overlaps with at least one of the second and fourth detection zones. At least one of the plurality of detection zones is approximately 10 degrees. The process may further comprise the step of ignoring the reflected laser beam after the laser beam is reflected from the first target. Preferably, the rotational arc is greater than 180 degrees and less than 360 degrees and centered about a reference axis which is substantially perpendicular to the central rotational axis.

The first target may comprise a plurality of reflective sections and a plurality of non-reflective sections with respective ones of the plurality of reflective sections alternating in position with respective ones of the plurality of non-reflective sections and one of the plurality of non-reflective sections being positioned so that the one non-reflective section is traversed last by the laser beam as the laser beam moves in the first angular direction with the first target positioned in the first detection zone or positioned so that the one non-reflective section is traversed last as the laser beam moves in the second angular direction with the first target positioned in the second detection zone. The first target may comprise a first reflective section, a second reflective section, a first non-reflective section and a second non-reflective section with the first and second reflective sections alternating in position with the first and second non-reflective sections, respectively. The second non-reflective section may form an edge of the first target and the first non-reflective section may include a portion which slopes across the first and second reflective sections. The process may further comprise the step of determining whether the reflected laser beam corresponds to a valid target.

According to yet another aspect of the present invention, a process for adjusting the orientation of a plane in which a laser beam is moved is provided. The laser beam is moved in at least a first angular direction along a rotational arc defined about a central rotational axis thereby defining a plane through which the laser beam is projected. A rotary position of the laser beam is monitored relative to the rotational arc. At least a first detection zone is established along the rotational arc based on the rotary position of the laser beam as the laser beam moves in the first angular direction with the first detection zone being less than 90 degrees. A reflected laser beam is detected from at least a first target positioned within the rotational arc and in the first detection zone as the laser beam is moved in the first angular direction. A first signal is generated having a first waveform representative of the reflected laser beam from the first target with the orientation of the plane being adjusted in response to the first signal.

According to a further aspect of the present invention, a process for adjusting the orientation of a plane in which a laser beam is moved is provided. The laser beam is moved back and forth in a first angular direction and a second angular direction along a rotational arc defined about a central rotational axis thereby defining a plane through which the laser beam is projected. A rotary position of the laser beam is monitored relative to the rotational arc. A plurality of detection zones are established along the rotational arc based on the rotary position of the laser beam with each of the detection zones being less than 90 degrees. A reflected laser beam is detected from at least a first target positioned within the rotational arc and in one of the plurality of detection zones. A first signal is generated having a first waveform representative of the reflected laser beam from the first target with the orientation of the plane being adjusted in response to the first signal. The plurality of detection zones includes at least a first detection zone and at least a second detection zone. The reflected laser beam is detected from the first target positioned in the first detection zone only when the laser beam is moved in the first angular direction and the reflected laser beam is detected from the first target positioned in the second detection zone only when the laser beam is moved in the second angular direction.

According to another aspect of the present invention, a laser transmitter comprises a photodetecting system, an optical system, a positioning device, a rotary encoder and a processor. The photodetecting system receives a reflected laser beam and generates a first signal having a first waveform representative of the reflected laser beam. The optical system is arranged to generate a laser beam and to direct the reflected laser beam to the photodetecting system. The optical system projects the laser beam radially in at least a first angular direction along a rotational arc defined about a central rotational axis thereby defining a plane through which the laser beam is projected. The positioning device is coupled to the optical system. The positioning device includes a first member and a second member for adjusting an angular orientation of the optical system with respect to a first axis and with respect to a second axis. The rotary encoder is arranged to produce a rotary signal indicative of a rotary position of the laser beam relative to the rotational arc. The processor is adapted to receive the first signal and the rotary signal. The processor is programmed to establish at least a first detection zone along the rotational arc in response to the rotary signal as the laser beam moves in the first angular direction. The first detection zone is less than 90 degrees. The processor is further programmed to identify a target position in the first detection zone only as the laser beam moves in the first angular direction and in response to the first signal and to control at least one of the first and second members of the positioning device in response to the target position thereby adjusting the plane through which the laser beam is projected.

Preferably, the rotational arc is greater than 180 degrees and less than 360 degrees and centered about a reference axis which is substantially perpendicular to the central rotational axis. The processor is further programmed to determine whether the reflected laser beam corresponds to a valid target position. The processor is further programmed to ignore a portion of the first signal received in the first detection zone with the laser beam moving in the first angular direction after a valid target position has been determined by the processor.

According to yet another aspect of the present invention, a laser transmitter comprising a photodetecting system, an optical system, a positioning device, a rotary encoder and a processor. The photodetecting system receives a reflected laser beam and generates a first signal having a first waveform representative of the reflected laser beam. The optical system is arranged to generate a laser beam and to direct the reflected laser beam to the photodetecting system. The optical system projects the laser beam radially back and forth in a first angular direction and a second angular direction along a rotational arc defined about a central rotational axis thereby defining a plane through which the laser beam is projected. The positioning device is coupled to the optical system. The positioning device includes a first member and a second member for adjusting an angular orientation of the optical system with respect to a first axis and with respect to a second axis. The rotary encoder is arranged to produce a rotary signal indicative of a rotary position of the laser beam relative to the rotational arc. The processor is adapted to receive the first signal and the rotary signal. The processor is programmed to establish a plurality of detection zones along the rotational arc. Each of the plurality of detection zones is less than 90 degrees and associated with one of the first and second angular directions of the laser beam with at least one of the plurality of detection zones being associated with the first angular direction of the laser beam and another of the plurality of detection zones being associated with the second angular direction of the laser beam. The processor is further programmed to identify a target position in at least one of the plurality of detection zones in response to the first signal. The target position is identified in each of the plurality of detection zones only as the laser beam moves in the angular direction associated with each respective detection zone. The processor is also programmed to control at least one of the first and second members of the positioning device in response to the target position thereby adjusting the plane through which the laser beam is projected.

According to yet another aspect of the present invention, a laser transmitting system comprises at least a first target, a photodetecting system, an optical system, a positioning device, a rotary encoder and a processor. The first target comprises a plurality of reflective sections and a plurality of non-reflective sections with respective ones of the plurality of reflective sections alternating in position with respective ones of the plurality of non-reflective sections. The photodetecting system receives a reflected laser beam and generates a first signal having a first waveform representative of the reflected laser beam. The optical system is arranged to generate a laser beam and to direct the reflected laser beam from the first target to the photodetecting system. The optical system projects the laser beam radially in at least a first angular direction along a rotational arc defined about a central rotational axis thereby defining a plane through which the laser beam is projected. The positioning device is coupled to the optical system. The positioning device includes a first member and a second member for adjusting an angular orientation of the optical system with respect to a first axis and with respect to a second axis. The rotary encoder is arranged to produce a rotary signal indicative of a rotary position of the laser beam relative to the rotational arc. The processor is adapted to receive the first signal and the rotary signal and is programmed to establish at least a first detection zone along the rotational arc in response to the rotary signal as the laser beam moves in the first angular direction. The first detection zone is less than 90 degrees. The processor is further programmed to identify the first target positioned in the first detection zones only as the laser beam moves in the first angular direction and in response to the first signal and to control at least one of the first and second members of the positioning device in response to the first signal thereby adjusting the plane through which the laser beam is projected.

According to yet a still further aspect of the present invention, a laser transmitting system comprises at least a first target, a photodetecting system, an optical system, a positioning device, a rotary encoder and a processor. The first target comprises a plurality of reflective sections and a plurality of non-reflective sections with respective ones of the plurality of reflective sections alternating in position with respective ones of the plurality of non-reflective sections. The photodetecting system receives a reflected laser beam and generates a first signal having a first waveform representative of the reflected laser beam. The optical system is arranged to generate a laser beam and to direct the reflected laser beam from the first target to the photodetecting system. The optical system projects the laser beam radially back and forth in a first angular direction and a second angular direction along a rotational arc defined about a central rotational axis thereby defining a plane through which the laser beam is projected. The positioning device is coupled to the optical system. The positioning device includes a first member and a second member for adjusting an angular orientation of the optical system with respect to a first axis and with respect to a second axis. The rotary encoder is arranged to produce a rotary signal indicative of a rotary position of the laser beam relative to the rotational arc. The processor is adapted to receive the first signal and the rotary signal and is programmed to establish a plurality of detection zones along the rotational arc. Each of the detection zones is less than 90 degrees and associated with one of the first and second angular directions of the laser beam with at least one of the plurality of detection zones being associated with the first angular direction of the laser beam and another of the plurality of detection zones being associated with the second angular direction of the laser beam. The processor is further programmed to identify the first target in one of the plurality of detection zones in response to the first signal only as the laser beam moves in the angular direction associated with each respective detection zone and to control at least one of the first and second members of the positioning device in response to the first signal thereby adjusting the plane through which the laser beam is projected.

Accordingly, it is an object of the present invention to provide an automatic and accurate system for distinguishing true target reflections from ghost target reflections. It is another object of the present invention to provide a system in which the orientation of a plane of laser light is accurately adjusted based on the true target reflections. It is a still further object of the present invention to provide such a system which is inexpensive and easy to operate. Other features and advantages of the invention will be apparent from the following description, the accompanying drawings and the appended claims.

BRIEF DESCRIPTION OF THE DRAWINGS

FIG. 3 is a schematic view of the laser transmitter of FIG. 1;

FIG. 4 is a front view of a target according to the present invention;

FIG. 9 is a waveform of a carrier oscillation portion of the waveform of FIGS. 6A, 7A and 8A;

FIG. 10 is a schematic view of the laser transmitter of FIG. 1 in a horizontal mode of operation;

FIG. 11 is a schematic view of the laser transmitter of FIG. 1 in a vertical mode of operation;

FIG. 14 is a perspective view of the laser transmitter of FIG. 1 in the vertical mode of operation in the presence of a shiny surface;

FIG. 15A is a waveform of a data signal portion of a waveform representative of modulated light reflected from the target and shiny surface of FIG. 14;

FIG. 15B is a waveform of a data signal portion of a waveform representative of modulated light reflected from a target and a shiny surface in which there is a gap between the target and the shiny surface;

FIG. 17 is a flowchart of a plane lock routine based on the detection zone arrangement of FIG. 16.

DETAILED DESCRIPTION OF THE PREFERRED EMBODIMENTS

Figure 1:
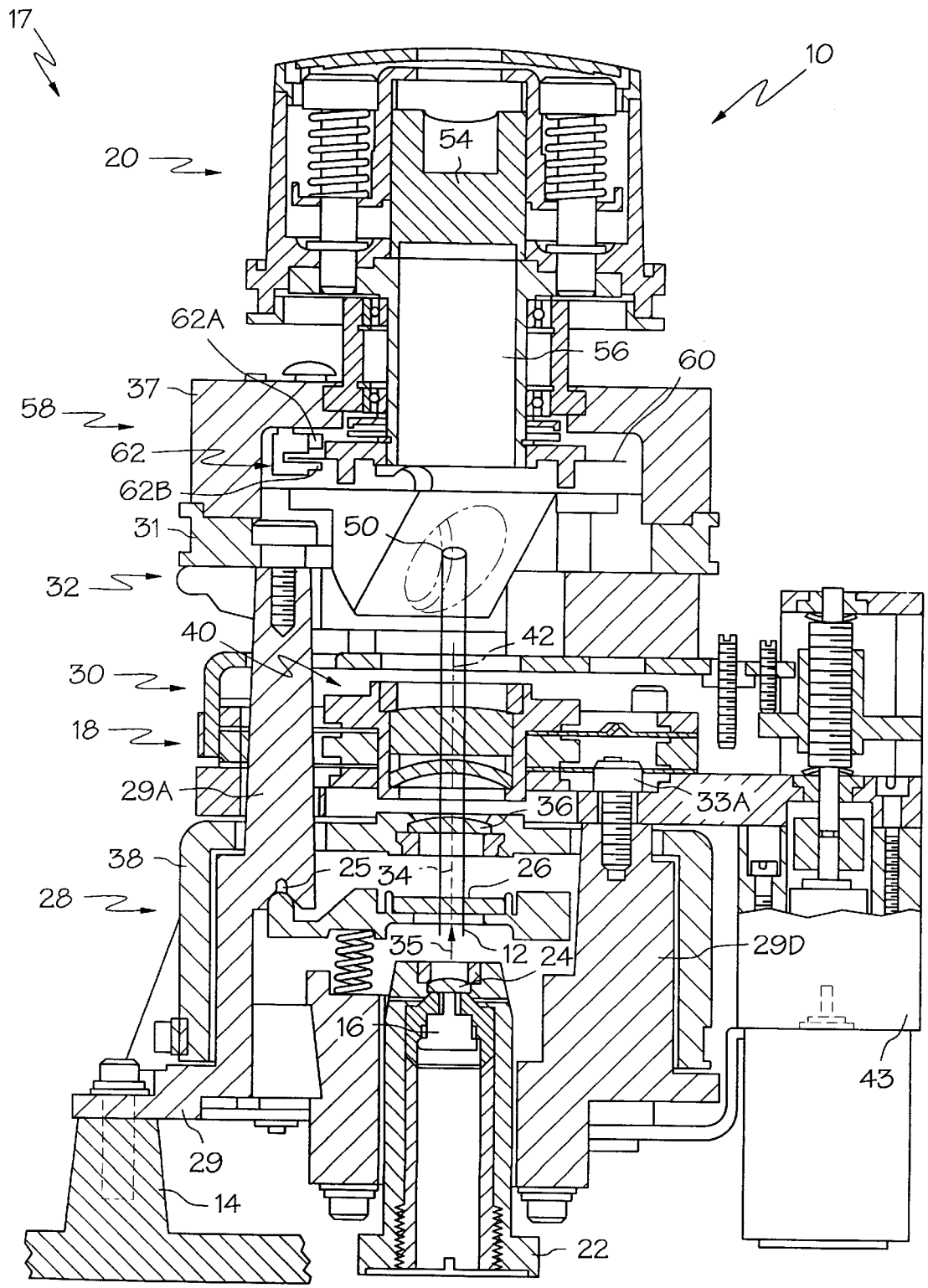
FIG. 1 is a cross-sectional view of a laser transmitter according to the present invention.

Referring now to FIG. 1, a laser transmitter 10 for transmitting a beam of laser light 12 is shown. The laser transmitter 10 includes a housing 14, a light source 16, and an optical system 17. The optical system 17 comprises an optical assembly 18 and an optical projecting device 20. The light source 16 is coupled to an assembly 22. According to the illustrated embodiment, the light source 16 is a laser diode which generates the beam of laser light 12. The assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

The optical assembly 18 includes a flat window 26, a compensator assembly 28 and a focusing mechanism 30. The compensator assembly 28 includes an optics frame 29, a compensator cup 38 and a wire clamp ring 31. The optics frame 29 is coupled to and supported by the housing 14. The assembly 22 is coupled to the optics frame 29. The flat window 26 is positioned above the collection lens 24. The flat window 26 is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along substantially vertical axis or projection axis 34. The laser beam 12 will therefore be plumb when the optics frame 29 is positioned along a plane which is substantially parallel with respect to the plane of the ground, i.e. substantially level. A plumb beam of light is light which is projected substantially vertical with respect to the ground. The laser beam 12 is projected along the projection axis 34 by the light source 16 and the collection lens 24 and made plumb through the flat window 26. It should be apparent that the laser beam will be plumb as long as the optics frame 29 is substantially level with respect to the ground.

Figure 2:
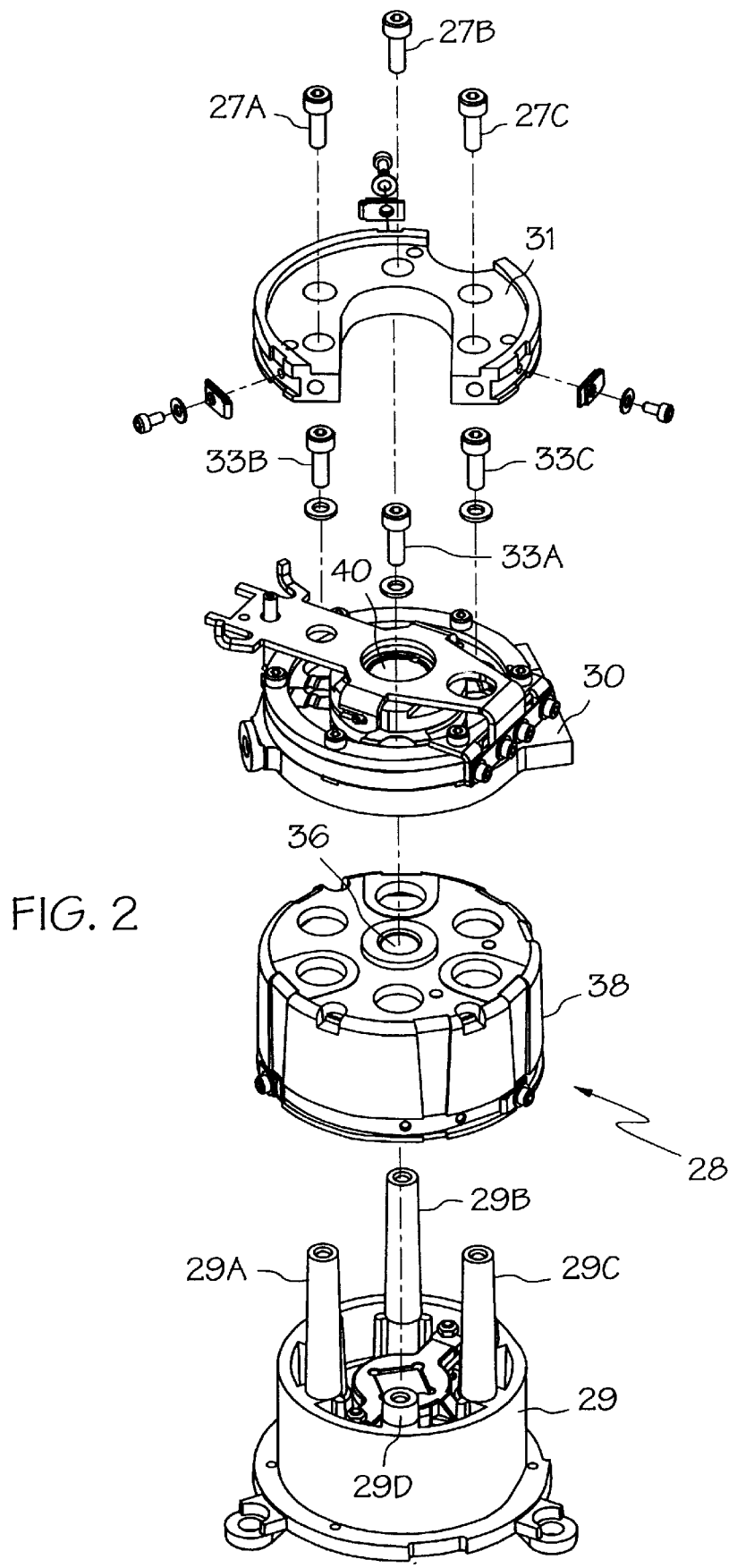
FIG. 2 is an exploded view of a compensator assembly shown in FIG. 1.

The compensator assembly 28 optically adjusts the position of the laser beam 12 so that it is plumb even when the optics frame 29 is not substantially level. As shown in FIG. 2, the compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts 29A, 29B, 29C by fasteners 27A, 27B, 27C. The compensator cup 38 is free to translate laterally when it is within a certain degree of level. In the illustrated embodiment, the compensator cup 38 is free to translate when it is within 12 minutes of level. As long as the compensator cup 38 is within 12 minutes of level, the compensating lens 36 may translate along the X and Y axes and optically adjust the position of the laser beam 12 so that it is plumb as it emerges from the compensator cup 38. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along projection axis 34, either singularly or in tandem.

The focusing mechanism 30 is positioned above the compensator cup 38 and coupled to the optics frame 29 through three small posts (only one post 29D shown) by three fasteners 33A, 33B, 33C. The three posts 29A, 29B, 29C of the optics frame 29 pass through the focusing mechanism 30 so that the focusing mechanism 30 does not contact the compensator cup 38. The focusing mechanism 30 includes a focusing lens 40 which is translated along the projection axis 34 to adjust the focus of the laser beam 12. The focusing mechanism 30 is positioned so that the projection axis 34 coincides with an optical axis 42 of the focusing lens 40. A plumb beam of laser light 12 is focused by the focusing mechanism 30 along the optical axis 42. The focusing mechanism 30 includes a focus motor 43 coupled to the focusing lens 40. The focus motor 43 is adapted to change the position of the focusing lens 40, thereby adjusting the focus of the laser beam 12. The focusing mechanism 30 is described in detail in application, U.S. Ser. No. 08/834,473 (Attorney Docket No. SPC 301 PA) now U.S. Pat. No. 5,867,522, FOCUSING MECHANISM USING A THIN DIAPHRAGM, filed Apr. 11, 1997, by Hayes, herein incorporated by reference. It will be appreciated by those skilled in the art that another focusing mechanism may be used without departing from the scope of the present invention. It will be further appreciated by those skilled in the art that the present invention may be practiced with or without the focusing mechanism 30.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser transmitter 10.

A photodetecting system 32 is coupled to the optics frame 29 and is positioned above the focusing mechanism 30. As shown in FIG. 3, the photodetecting system 32 includes a reflector 44, a lens 45, a photodetector 46 and a detector circuit 48. The reflector 44 includes an aperture 50 positioned along optical axis 42; see also FIG. 1. The aperture 50 is sized to pass the laser beam 12. The reflector 44 also includes a reflective surface 44a to reflect returned light to the photodetector 46.

Referring to FIGS. 1 and 2, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical. The pentaprism 54 is a structure which deflects incoming light at a ninety-degree angle with respect to the direction of the incoming light, within limits, regardless of the precise orientation of the pentaprism 54. Consequently, the incoming light does not have to hit the pentaprism 54 at an exact location in order to be deflected ninety degrees. The pentaprism 54 is rotated within the spindle 56 by the motor at a speed of approximately 50 rpm to define a substantially horizontal plane of light. A speed of 50 rpm is well suited for visible perception of the laser light 12 by the user. However, as will be appreciated by those skilled in the art the pentaprism 54 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used. While the laser transmitter 10 has been described with the laser light 12 being transmitted upwards, it will be appreciated by those skilled in the art that optical components may be shifted appropriately so that the laser light 12 is transmitted downwards, with the optical projecting device 20 being the lower most component and the light source 16 and assembly 22 being the upper most components. It will be further appreciated by those skilled in the art that the compensator cup 38 may be locked in place with the laser transmitting device 10 positioned on its side so as to project a generally vertical beam of light.

The optical projecting device 20 also includes an optical rotary encoder 58. The optical rotary encoder 58 includes an encoder disc 60 and a read head 62. The encoder disc 60 has graduations around the periphery of the disc which are read by the read head 62. The read head 62 includes an optical source 62A and an optical detector 62B. The encoder disc 60 is positioned between the optical source 62A and the optical detector 62B so that as the encoder disc 60 rotates, the read head 62 generates a rotary signal representative of the position of the encoder disc 60, and hence the pentaprism 54. As is well known in the art, the encoder disc 60 may contain graduations which are spaced in a manner so that each position around the disc is uniquely referenced. Alternatively, in the illustrated embodiment, the encoder disc 60 contains a reference mark graduation (not shown) and a number of equally spaced graduations so that the position around the encoder disc 60 is referenced to the reference mark graduation.

Referring now to FIGS. 3 and 4, a target 64 is placed at a desired location. According to the illustrated embodiment as shown in FIG. 4, the target 64 comprises at least four sections, 64A, 64B, 64C, 64D. The target 64 includes a first reflective section 64A, a second reflective section 64C, a first non-reflective section 64B positioned between the first and second reflective sections 64A, 64C, and a second non-reflective section 64D positioned substantially adjacent the second reflective section 64C. The second non-reflective section 64D forms the trailing edge of the target 64. In the illustrated embodiment, the first and second reflective sections 64A, 64C are composed of a reflective material while the first and second non-reflective sections 64B, 64D are composed of a non-reflective material. It will be appreciated by those skilled in the art that the non-reflective sections 64B, 64D may be composed of materials which are not completely non-reflective as long as reflective characteristics of such material is different from the reflective characteristics of the material forming the reflective sections 64A, 64C so that the non-reflective sections 64B, 64D may be distinguished from the reflective sections 64A, 64C.

The target 64 includes a first target region 64E, a second target region 64F and a third target region 64G. The width of the first non-reflective section 64B is substantially constant in each of the target regions 64E–64G. In the first target region 64E, a first width or dimension of the first reflective section 64A is greater than a second width or dimension of the second reflective section 64C. Similarly, in the third target region 64G, the second dimension of the second reflective section 64C is greater than the first dimension of the first reflective section 64A. In the second target region 64F, the first non-reflective section 64B slopes across the first and second reflective sections 64A, 64C such that in a first direction 66 the first dimension decreases with a proportional increase of the second dimension. In the illustrated embodiment, the first dimension substantially equals the second dimension substantially in the center 64H of the target 64. It will be appreciated by those skilled in the art that the target 64 may comprise more than four total sections. A target having multiple reflective and non-reflective sections may be used for greater accuracy without departing from the scope of the present invention.

It should be apparent that the target 64 should be comprised of alternating reflective and non-reflective sections with at least two reflective sections, at least one non-reflective section positioned therebetween, and a non-reflective section forming the trailing edge of the target 64. The orientation of the plane as defined by the rotating laser beam 12 is adjusted by detecting the light reflected from the target 64. The photodetecting system 32 is designed to detect light which is reflected from the reflective sections 64A, 64C of the target 64. Typically, a non-reflective section forming the leading or trailing edge of the target 64 would be irrelevant as the photodetecting system 32 would not be able to distinguish the first or last non-reflective section from the surrounding environment. The photodetecting system 32 is only able to detect a non-reflective section if the non-reflective section is surrounded by reflective sections.

However, the leading or trailing edge of the target 64 should be non-reflective so as to isolate the target 64 from any interfering surfaces as described herein. In the illustrated embodiment, the target 64 is comprised of a single integral unit including sections 64A, 64B, 64C and 64D. However, the target 64 may comprise separate and distinct sections 64A, 64B, 64C and 64D which are positioned a set distance from each other, or separate and distinct reflective sections 64A, 64C separated a set distance from each other along with a separate and distinct non-reflective section 64D.

Figure 5:
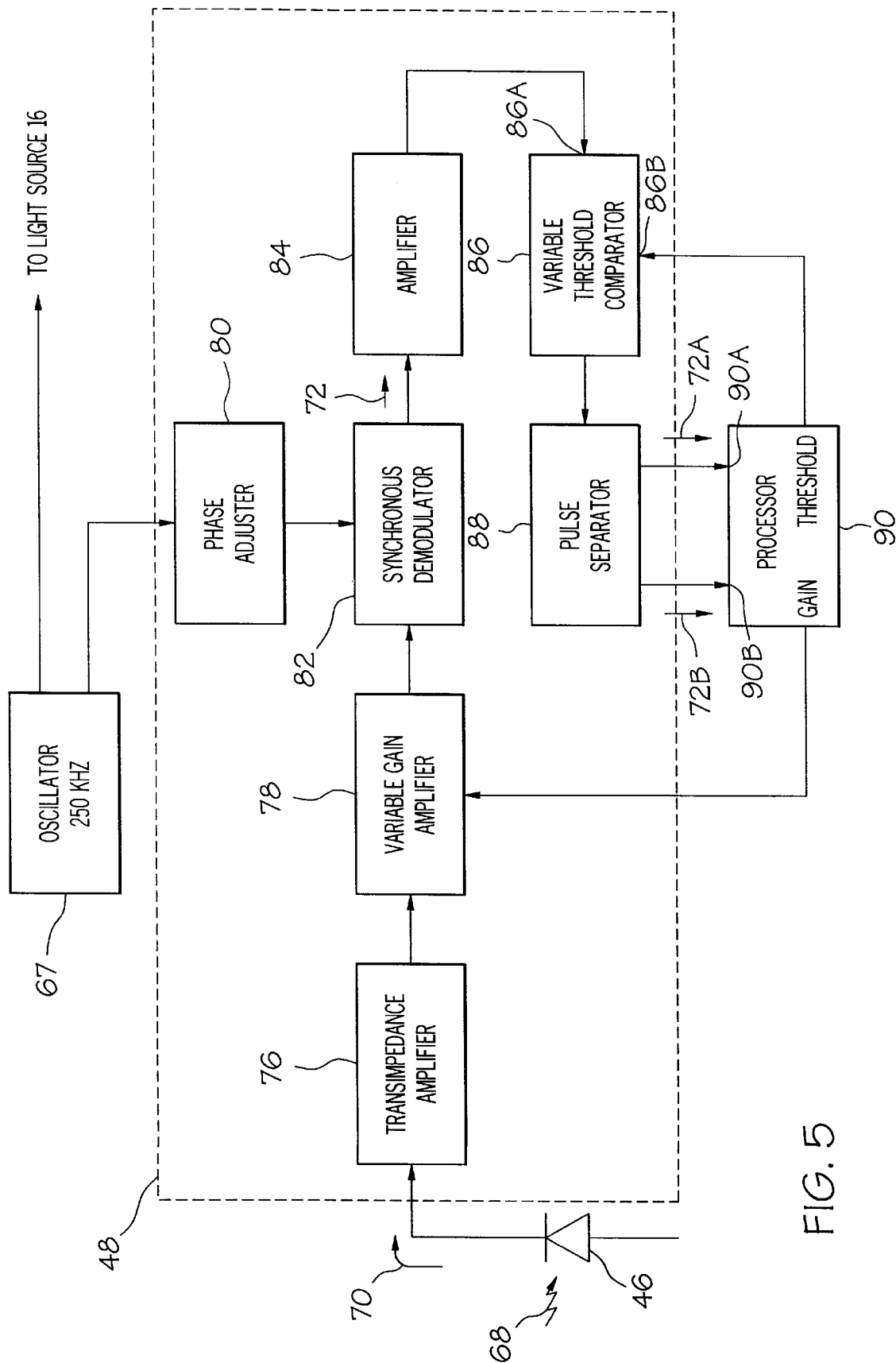
FIG. 5 is a schematic diagram of a detector circuit of the laser transmitter of FIG. 1.

During plane lock in which the orientation of the rotating laser beam 12 is adjusted until it defines a desired plane, the compensator cup 38 is locked in place so that the orientation of the rotating laser beam 12 may be adjusted without having to compensate with the automatic leveling capabilities of the compensator assembly 28. The laser beam 12 is also modulated by an oscillator 67 which supplies power to the light source 16, as shown in FIG. 5. The laser beam 12 is modulated to distinguish the laser beam 12 from other light sources, such as any of the numerous other ambient light sources. Preferably, the oscillator 67 generates a 250 KHz carrier oscillation signal. It will be appreciated by those skilled in the art that other frequencies may be used to modulate the laser beam 12. It should be further appreciated by those skilled in the art that the laser beam 12 may be transmitted without any modulation. As shown in FIG. 3, the modulated laser beam 12 is swept across the target 64. In the illustrated embodiment of FIG. 4, the laser beam 12 is swept across the target 64 generally perpendicular to the first direction 66 as represented by laser beam trace 12A. However, it should be apparent that the laser beam 12 may be swept across the target 64 having orientations other than generally perpendicular to the first direction 66 since the configuration of the target 64 with the sloped non-reflective section 64B produces proportionate changes in the length of time in which the laser beam 12 traverses each section 64A, 64B, 64C and 64D of the target 64. For example, if the laser beam 12 is tilted as represented by laser beam trace 12B, the length of time in which the laser beam 12 traverses the first reflective section 64A increases in the same proportion as the length of time in which the laser beam 12 traverses the second reflective section 64C. As the changes in length of time the laser beam 12 traverses each section 64A, 64B, 64C and 64D is directly proportional to orientation of the laser beam 12 across the target 64, the laser beam 12 may be swept across the target 64 with orientations other than generally perpendicular to the first direction without departing from the scope of the present invention.

A reflected beam of laser light 68 is reflected back towards the laser transmitter 10. For clarity and ease of description, the reflected beam of laser light 68 has been given a separate designation from the laser beam 12 even though they are the same beam. The reflected beam of laser light 68 consists of two pulses of light each time the laser light 12 is reflected from the first and second reflective sections 64A, 64C of the target 64. The reflected light 68 is received by the pentaprism 54 and reflected towards the reflector 44. The reflected light 68 is then reflected by the reflective surface 44a of reflector 44 and focused by the lens 45 onto the photodetector 46.

Figure 6A:
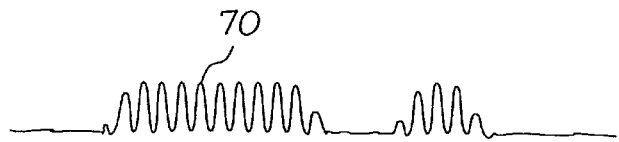
FIG. 6A is a waveform representative of modulated light reflected from a first target region of the target of FIG. 4.
Figure 6B:
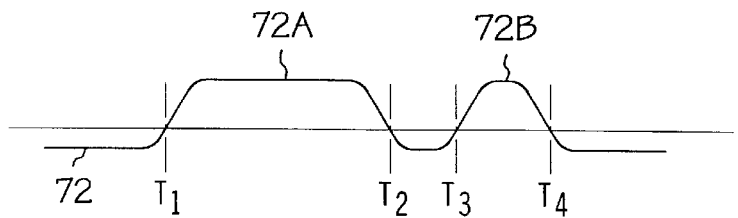
FIG. 6B is a waveform of a data signal portion of the waveform of FIG. 6A.
Figure 7A:
FIG. 7A is a waveform representative of modulated light reflected from a second target region of the target of FIG. 4.
Figure 7B:
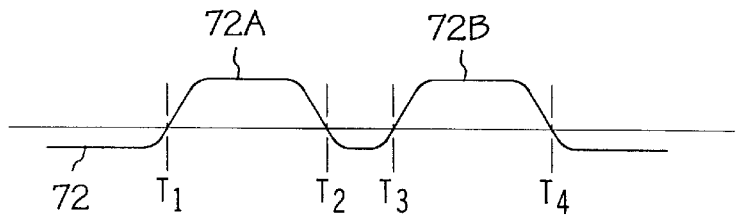
FIG. 7B is a waveform of a data signal portion of the waveform of FIG. 7A.
Figure 8A:
FIG. 8A is a waveform representative of modulated light reflected from a third target region of the target of FIG. 4.

As shown in FIGS. 6A, 7A and 8A, the photodetector 46 generates a signal 70 having a waveform representative of the reflected light 68. In the illustrated embodiment, the photodetector 46 is a PIN diode such that the signal 70 is in current form. The waveform comprises two pulses representative of the time periods in which the laser light 12 sweeps across the first and second reflective sections 64A, 64C of the target 64. The signal 70 is basically an amplitude modulated signal with a data signal portion 72 and the 250 Khz carrier oscillation signal portion 74 (see FIGS. 6B, 7B, 8B and 9). The signal 70 is transmitted to the detector circuit 48 as part of the plane lock routine.

Referring to FIG. 5, the detector circuit 48 includes a transimpedance amplifier 76, a variable gain amplifier 78, a phase adjuster 80, a synchronous demodulator 82, an amplifier 84, a variable threshold comparator 86 and a pulse separator 88. The photodetector 46 is coupled to the transimpedance amplifier 76. The transimpedance amplifier 76 converts the current form of the signal 70 generated by the photodetector 46 to a voltage form of the signal 70. The voltage form of the signal 70 is transmitted to the variable gain amplifier 78. In the illustrated embodiment, the variable gain amplifier 78 has a low gain mode and a high gain mode. The low gain mode is used when the target 64 is close to the laser transmitter 10 since more light is reflected back. The high gain mode is used when the target 64 is far from the laser transmitter 10 since less light is reflected back. The variable gain helps prevent the detector circuit 48 from saturating when an excessive amount of light is reflected back to the laser transmitter 10. It will be appreciated by those skilled in the art that the transimpedance amplifier 76 could be a variable gain transimpedance amplifier. It will be fully appreciated by those skilled in the art that the detector circuit 48 could be prevented from going into saturation by using a conventional clipping circuit.

Figure 8B:
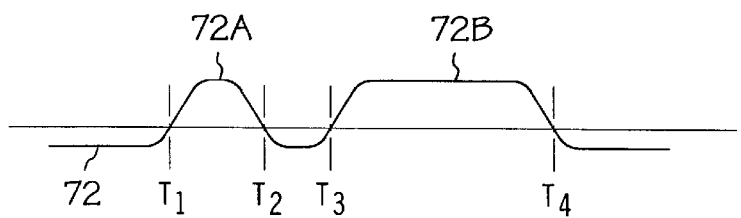
FIG. 8B is a waveform of a data signal portion of the waveform of FIG. 8A.

The phase adjuster 80 receives the carrier oscillation signal of FIG. 9 which was used to modulate the laser beam 12. The phase adjuster 80 adjusts the phase of the carrier oscillation signal to match the phase of the signal 70. The adjusted oscillation signal is fed to the synchronous demodulator 82 along with the signal 70 from the variable gain amplifier 78. The synchronous demodulator 82 separates the carrier oscillation signal portion 74 from the data signal portion 72. As shown in FIGS. 6B, 7B and 8B, the data signal portion 72 comprises a first pulse 72A and a second pulse 72B. The synchronous demodulator 82 outputs the data signal portion 72 which is then amplified by the amplifier 84.

The amplified data signal portion 72 is inputted into a first input 86A of the variable threshold comparator 86. A second input 86B of the variable threshold comparator 86 receives a threshold voltage which sets the threshold capability of the variable threshold comparator 86. A threshold voltage is used to filter out background noise that may be detected by the photodetector 46. The variable threshold comparator 86 outputs the portions of the amplified data signal portion 72 which exceed the voltage threshold as established by the second input 86B. As the laser beam 12 is swept across the reflective sections 64A, 64C, the data signal pulses 72A, 72B extracted by the detection circuit 48 should exceed the threshold voltage.

The threshold voltage may be adjusted based on the approximate distance between the target 64 and the laser transmitter 10. A lower threshold voltage may be set when a relatively weak signal is received while a higher threshold voltage may be set when a relatively strong signal is received. A stronger signal will be generated as the target 64 is moved closer to the laser transmitter 10.

The amplified data signal portion 72 outputted from the variable threshold comparator 86 is inputted into the pulse separator 88. The pulse separator 88 separates the two pulses 72A, 72B into separate component pulses, i.e. the first pulse 72A and the second pulse 72B. The first pulse 72A is transmitted to a first timer input 90A of a processor 90 while the second pulse 72B is transmitted to a second timer input 90B of the processor 90. The processor 90 includes an internal clock and an edge detector which establish the time interval in which a transition is made by each pulse 72A, 72B. As shown in FIGS. 6B, 7B and 8B, the first transition is set as $T_1$, the second transition is set as $T_2$, the third transition is set as $T_3$ and the fourth transition is set as $T_4$.

The first time period $TP_1$ ($T_2-T_1$), represents the duration of time in which the laser beam 12 sweeps across the first reflective section 64A of the target 64. The second time period or deadband period $TP_2$ ($T_3-T_2$), represents the duration of time in which the laser beam 12 sweeps across the first non-reflective section 64B of the target 64. The third time period $TP_3$ ($T_4-T_3$), represents the duration of time in which the laser beam 12 sweeps across the second reflective section 64C of the target 64. The processor 90 is programmed to analyze the time periods in order to adjust the orientation of the rotating laser beam 12 so that it produces a plane which substantially intersects the center 64H of the target 64.

The processor 90 is programmed to adjust the orientation of the laser beam 12 so that the rotating laser beam 12 forms a plane which substantially intersects the center 64H of the target 64. The processor 90 may be programmed to adjust the orientation of the rotating laser beam 12 in a number of different ways based on the measured time periods $TP_1$, $TP_2$ and $TP_3$. As shown in FIG. 7B, the rotating laser beam 12 forms a plane which substantially intersects the center 64H of the target 64 when the pulses 72A and 72B are substantially equal. Accordingly, the ratio of the first time period $TP_1$ to the third time period $TP_3$ will substantially equal one when the rotating laser beam 12 forms a plane which substantially intersects the center 64H. Similarly, the difference of the first and third time periods $TP_1$ and $TP_3$ may be used to determine the proper orientation as the difference substantially equals zero at the center 64H. It will be appreciated by those skilled in the art that other methods may be used to adjust the orientation of the laser beam 12 based on the measured time periods $TP_1$, $TP_2$ and $TP_3$.

The ratio or difference of the first and third time periods $TP_1$ and $TP_3$ vary between two extremes as set by the first and third regions 64E and 64G. As shown in FIG. 6B, the first time period $TP_1$ is greater than the third time period $TP_3$ by a fixed set amount when the orientation of the rotating laser beam 12 forms a plane which traverses the first target region 64E. The ratio or difference of the first and third time periods $TP_1$ and $TP_3$ is one of the set extreme amounts such that the processor 90 is programmed to adjust the orientation of the rotating laser beam 12 downwards towards the second target region 64F. Similarly, as shown in FIG. 8B, the first time period $TP_1$ is less than the third time period $TP_3$ by a fixed set amount when the rotating laser beam 12 forms a plane which traverses the third target region 64G. The ratio or difference of the first and third time periods $TP_1$ and $TP_3$ is the other of the set extreme amounts such that the processor 90 is programmed to adjust the orientation of the rotating laser beam 12 upwards towards the second target region 64F. The first and third regions 64E and 64G are used to give the processor 90 an indication of the direction in which to adjust the rotating laser beam 12 so that the rotating laser beam 12 forms a plane which first traverses the second target region 64F and eventually substantially intersects the center 64H. It should be apparent to those skilled in the art that the processor 90 may be programmed to adjust the rotating laser beam 12 to other than the center 64H of the target 64. It will be further appreciated by those skilled in the art that the desired plane does not have to intersect the area in which the first dimension substantially equals the second dimension.

In the illustrated embodiment, the processor 90 is programmed so that the orientation of the rotating laser beam 12 may be quickly adjusted once the rotating laser beam 12 forms a plane which traverses the second target region 64F. The processor 90 is programmed to estimate a distance Z in which to adjust an angular position of the laser transmitter 10 so that the rotating laser beam 12 forms a plane which substantially intersects the center 64H of the target 64, and thus the desired plane.

As shown in FIG. 4, the rotating laser beam 12 may traverse the target 64 as represented by laser trace 12A. The distance Z to the center 64H may be estimated using the formula:

$$Z = m(X_1 - X_2)/2 \qquad (1)$$

where:
    m defines the slope of the first non-reflective section 64B;
    $X_1$ defines the distance in the first reflective section 64A to the first non-reflective section 64B; and
    $X_2$ defines the distance in the second reflective section 64C to the first non-reflective section 64B.

The distances $X_1$ and $X_2$ may be calculated from the measured time periods $TP_1$ and $TP_3$ using the formulas:

$$X_1 = v^* TP_1 \qquad (2)$$

$$X_2 = v^* TP_3 \qquad (3)$$

where:
    v defines the linear velocity of the rotating laser beam 12.

Substituting equations (2) and (3) in equation (1) yields:

$$Z = m^* v(TP_1 - TP_3)/2. \qquad (4)$$

The velocity v may be estimated from the angular velocity w of the rotating laser beam 12 and the distance R between the target 64 and the laser transmitter 12 using the formula:

$$v = w^* R. \qquad (5)$$

Substituting equation (5) in equation 4 yields:

$$Z = m^* w^* R(TP_1 - TP_3)/2. \qquad (6)$$

The number of radians $\ominus$ in which to adjust the angular position of the laser transmitter 10 may be estimated using the formula:

$$\ominus = Z/R. \qquad (7)$$

Substituting equation (6) in equation (7) yields:

$$\ominus = m^* w(TP_1 - TP_3)/2. \qquad (8)$$

As shown in equation (8), the number of radians $\ominus$ in which to adjust the angular position of the laser transmitter 10 may be estimated without having to calculate the distance R. However, the distance R is easily estimated based on the measured target width which is the sum of the three time periods $TP_1$, $TP_2$ and $TP_3$. With the distance Z or radians $\ominus$ calculated, the processor 90 may be programmed to quickly control the orientation of the laser transmitter 10, and hence, the rotating laser beam 12, so that the rotating laser beam 12 forms a plane which substantially intersects the center 64H of the target 64.

The distance R may be estimated based on the total duration of the three time periods $TP_1$, $TP_2$ and $TP_3$ since the total duration is inversely proportional to the distance, i.e. shorter for longer distances and longer for shorter distances. The processor 90 includes a data table which sets the gain of the variable gain amplifier 78 and the voltage threshold of the variable threshold comparator 86 based on the estimated distance R. The data table is developed based on the target width and is accessed by the plane lock routine. The processor 90 is also programmed to adjust the gain and/or threshold of the detector circuit 48 if the target 64 has not been detected for a predetermined period of time in order to change the sensitivity of the detector circuit 48. The processor 90 expects to detect the target 64 when in plane lock mode so that the gain and/or threshold is adjusted to increase the sensitively of the detector circuit 48 and the likelihood of detecting the target 64. The gain and/or threshold may be adjusted at any desired rate, i.e. after each revolution of the pentaprism 54.

The laser transmitter 10 may be placed in a horizontal position as shown in FIG. 10 or a vertical position as shown in FIG. 11. In either of the positions, the rotating laser beam 12 may be set to a desired planar orientation using one or two targets 64. As shown in FIG. 10, two targets 64 are used to define the plane in which the laser beam 12 is rotated. The first target 64$_1$ is positioned at a first point 92 having a predetermined angular orientation with respect to an X or first axis 94 and the second target 64$_2$ is positioned at a second point 96 having a predetermined angular orientation with respect to a Y or second axis 98. In the illustrated embodiment, the first axis 94 is substantially orthogonal to the second axis 98. However, it will be appreciated by those skilled in the art, that the first and second axes 94, 98 may be positioned at other angular relationships with respect to each other. The laser transmitter 10 is positioned at a third point 100 which corresponds to the intersection of the first and second axes 94, 98. The laser beam 12 is rotated about a central rotational axis 101 which passes through the third point 100 and the intersection of the first and second axes 94, 98. The plane in which the laser beam 12 is rotated is defined by the first, second and third points 92, 96 and 100. The first and second axes 94, 98 are defined by the laser transmitter 10 such that the first and second points 92, 96 are referenced with respect to the laser transmitter 10.

The laser beam 12 is swept across both of the targets 64$_1$, 64$_2$ and signals 70 representative of the laser beam 12 reflected from each of the targets 64$_1$, 64$_2$ are detected by the photodetecting system 32. The processor 90 is programmed so that the laser transmitter 10 is adjusted about the first axis 94 in response to the signal 70 generated by the reflected light 68 from the first target 64$_1$ and about the second axis 98 in response to the signal 70 generated by the reflected light 68 from the second target 64$_2$. The targets 64$_1$, 64$_2$ do not have to be separated by exactly 90 degrees as the processor 90 is programmed to set one target 64 as corresponding to the first axis 94 and the other target 64 as corresponding to the second axis 98. The angular position of each of the targets 64$_1$, 64$_2$ about the laser transmitter 10 is determined by the rotary encoder 58. The position of the pentaprism 54, and hence, the corresponding target 64 is determined by the rotary encoder 58 as soon as the reflected light 68 is detected by the photodetecting system 32. Once the position of each of the targets 64$_1$, 64$_2$ is determined with respect to the axes 94, 98, the processor 90 establishes a reference system for adjusting the position of the laser transmitter 10.

It should be apparent that one target 64 may be used to establish the desired plane for the rotating laser beam 12. The laser transmitter 10 is leveled with respect to one of the axes, i.e. second axis 98, using a leveling vial (not shown) coupled to the laser transmitter 10. Once the laser transmitter 10 is level with respect to the second axis 98, the angular orientation of the laser transmitter 10 is adjusted with respect to the first axis 94 so that the rotating laser beam 12 intersects the first target 64$_1$ positioned at the first point 92. The rotating laser beam 12 therefore forms a plane defined by the first point 92, the third point 100 and the second axis 98.

As shown in FIG. 11, one target 64 is used to adjust the orientation of the rotating laser beam 12. The orientation of the laser transmitter 10 is adjusted so that the laser transmitter 10 is level with respect to the second axis 98. It should be noted that the first and second axes 94, 98 are merely rotated ninety degrees from the position as shown in FIG. 10. A leveling vial (not shown) is used to level the laser transmitter 10 with respect to the second axis 98. The orientation of the laser transmitter 10 is then adjusted so that the rotating laser beam 12 forms a plane defined by the target 64, the position of the laser transmitter 10 and the second axis 98. It will be appreciated by those skilled in the art that two targets 64 may be used to orient the rotating laser beam 12 to the desired plane as described with respect to FIG. 10. It will be further appreciated by those skilled in the art that the laser transmitter 10 may be offset a predetermined number of degrees from the second axis 98 and thus form a desired plane defined by the position of the one target 64, the position of the laser transmitter 10 and the offset of the laser transmitter 10 with respect to the second axis 98.

Figure 12:
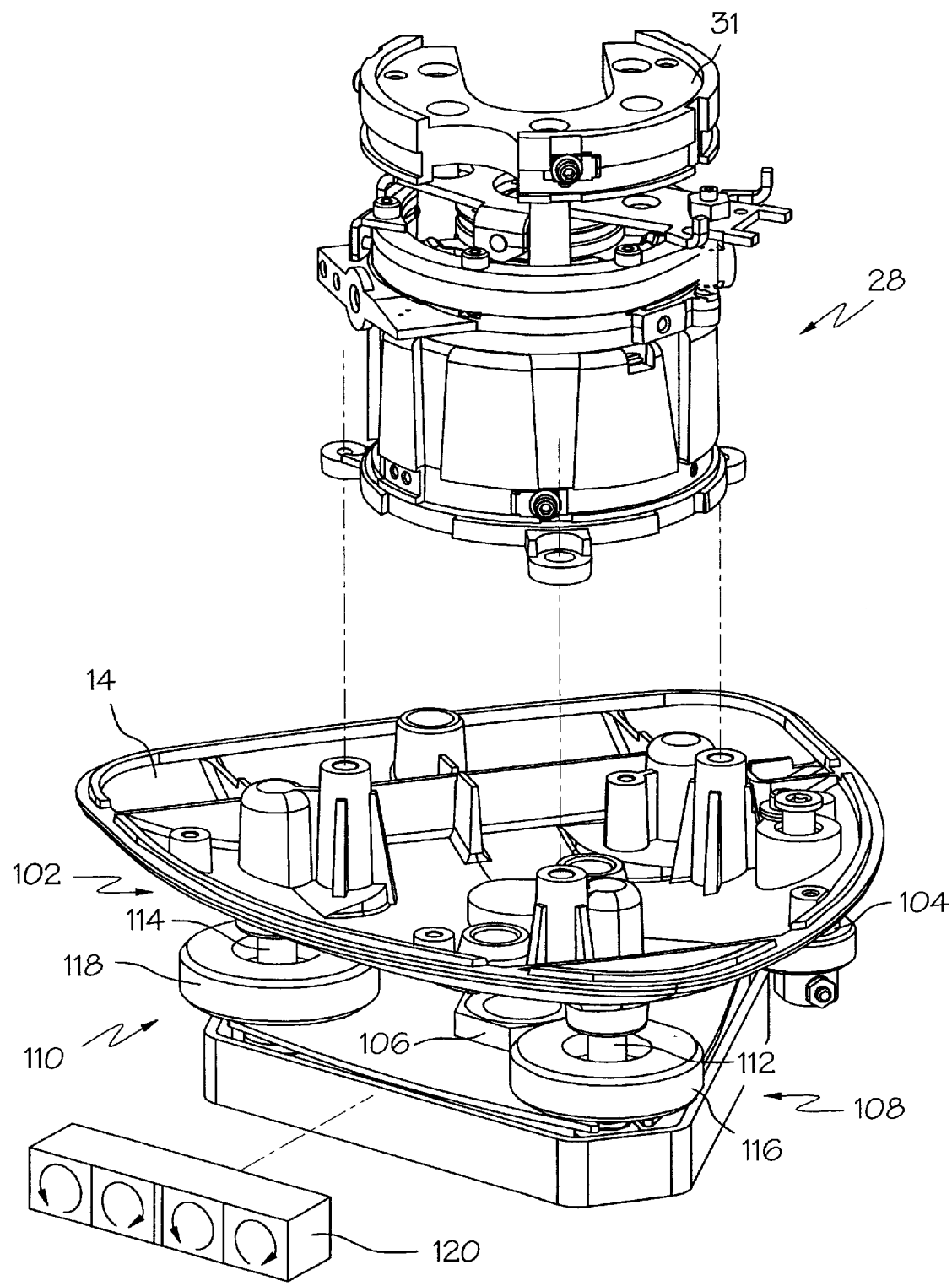
FIG. 12 is a perspective view of a positioning device according to one embodiment of the present invention.

The orientation of the laser transmitter 10 with respect to the first and second axes 94, 98 may be adjusted manually or automatically. According to one embodiment of the present invention, the processor 90 is programmed to control a positioning device 102 which is coupled to the housing 14 through a pivot joint 104; see FIG. 12. The positioning device 102 is coupled to a tripod (not shown) through a mounting device 106. The positioning device 102 comprises a first member or a first positioning device 108 and a second member or a second positioning device 110. The first and second positioning devices 108, 110 adjust the position of the housing 14 and hence the rotating laser beam 12, with respect to the first and second axes 94, 98. The position of the housing 14, and hence, the laser transmitter 10 changes with respect to the positioning device 102, and hence, with respect to the first and second axes 94, 98. The first positioning device 108 includes a first adjustable screw 112 while the second positioning device 110 includes a second adjustable screw 114. Rotation of the adjustable screws 112, 114 causes the housing 14 to pivot about pivot joint 104, thereby adjusting the position of the housing 14 and the laser transmitter 10 with respect to the first and second axes 94, 98. The adjustable screws 112, 114 may be rotated manually via a first knob 116 and a second knob 118. The processor 90 controls an indicator device 120 which instructs the operator which knob 116, 118 to turn and in which direction. The indicator device 120 may comprise a set of light emitting diodes or a display device which indicates the direction in which to adjust the position of the housing 14 and the laser transmitter 10. The processor 90 controls the indicator device 120 until the rotating laser beam 12 forms a plane which intersects the center 64H of one or two targets 64.

Figure 13:
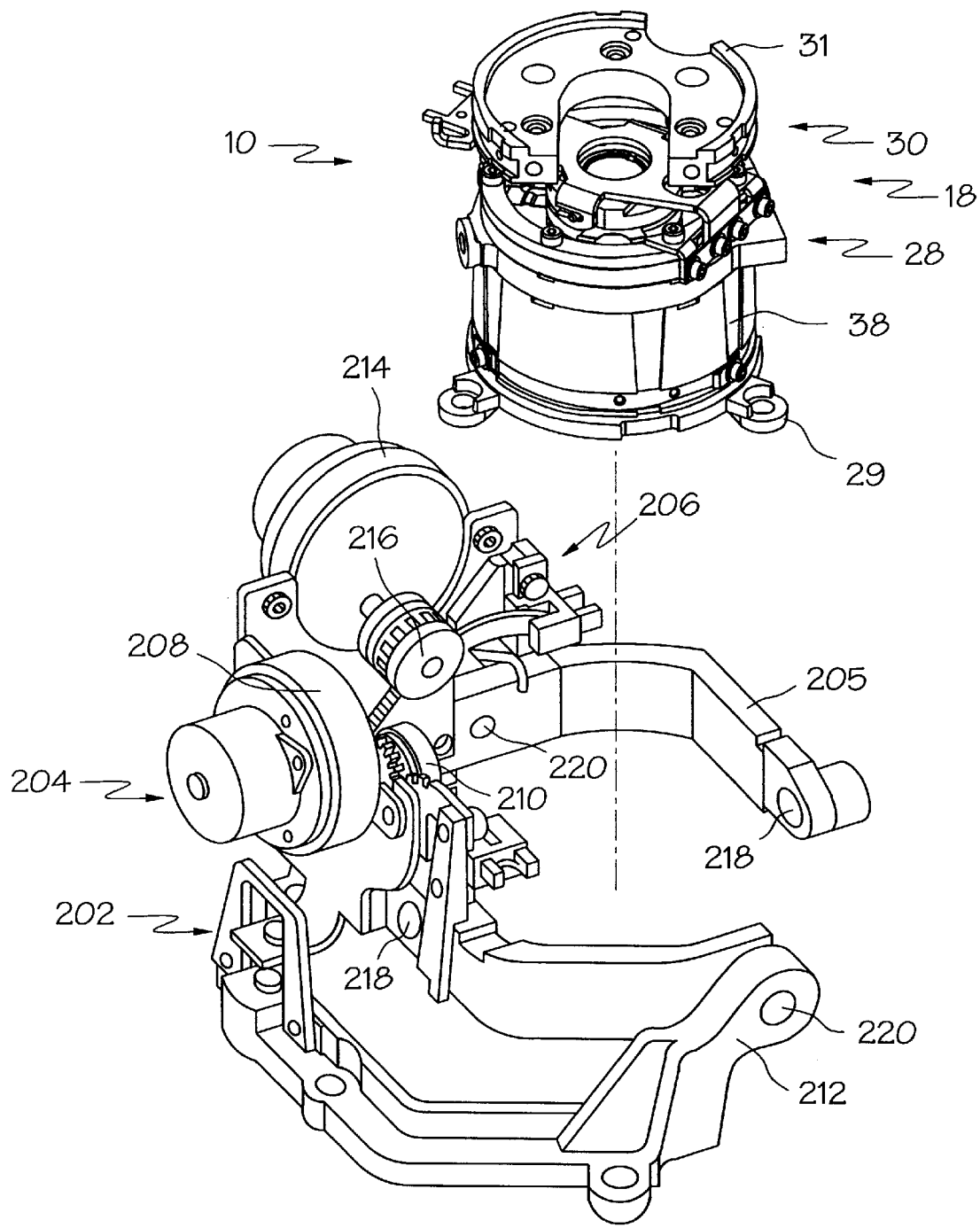
FIG. 13 is a perspective view of a positioning device according to another embodiment of the present invention.

The orientation of the laser transmitter 10, and hence the rotating laser beam 12, may be adjusted directly and automatically according to another embodiment of the present invention. A positioning device 202 is shown in FIG. 13. The positioning device 202 includes a first member 204 for adjusting the position of the laser transmitter 10, and hence the rotating laser beam 12, with respect to the first axis 94, and a second member 206 for adjusting the position of the laser transmitter, and hence the rotating laser beam 12, with respect to the second axis 98. The first member 204 includes an inner gimbal mechanism 205, a first axis motor 208, and a first axis gearing mechanism 210. The second member 206 includes the inner gimbal mechanism 205, an outer gimbal mechanism 212, a second axis motor 214, and a second axis gearing mechanism 216. The compensator assembly 28 is rotatably coupled to the inner gimbal mechanism 205 through mutually opposing pivot joints 218. The outer gimbal mechanism 212 is rotatably coupled to the inner gimbal mechanism 205 through mutually opposing pivot joints 220. The outer gimbal mechanism 212 is mounted to a mounting device (not shown) through mounting posts (not shown). The outer gimbal mechanism 212 is fixed while the compensator assembly 28 is suspended from the inner gimbal mechanism 205.

The first axis motor 208 is coupled to the inner gimbal mechanism 205 and to the compensator assembly 28 through the first axis gearing mechanism 210. The first axis motor 208 effectuates rotation of the first axis gearing mechanism 210 which causes rotation of the compensator assembly 28 within the inner gimbal mechanism 205 and about the first axis 94. The second axis motor 214 is coupled to the outer gimbal mechanism 212 and to the inner gimbal mechanism 205 through the second axis gearing mechanism 216. The second axis motor 214 effectuates rotation of the second axis gearing mechanism 216 which causes rotation of the inner gimbal mechanism 205 about the second axis 98. The compensator assembly 28 and the laser transmitter 10 rotate about the second axis 98 with the inner gimbal mechanism 205. The first axis motor 208 rotates with the inner gimbal mechanism 205 while the second axis motor 214 remains fixed to the outer gimbal mechanism 212. The processor 90 is programmed to control the first and second axis motors 208, 214 until the rotating laser beam 12 forms a plane which intersects the center 64H of one or two targets 64.

In the illustrated embodiment, the first and second axis motors 208, 214 are stepper motors. The processor 90 estimates the number of steps in which to move the first and second axis motors 208, 214 using the formula:

$$NS=\Theta/k \qquad (9)$$

where:
k defines the angular movement of the motors per step.
Substituting equation (8) in equation (9) yields:

$$NS=(m^*w(TP_1-TP_3)/2)/k. \qquad (10)$$

Once the processor estimates the number of steps in which to move the motors 208, 214, the rotating laser beam 12 may define the desired plane quickly.

It will be appreciated by those skilled in the art that the manual and automatic plane lock operations are not restricted to the disclosed positioning devices 102, 202. The angular position of the laser transmitter 10 may be automatically adjusted with respect to the housing 14 by replacing the first and second axis knobs 116, 118 with positioning motors controlled by the processor 90. Similarly, the angular position of the laser transmitter 10 may be manually adjusted with respect to the compensator assembly 28 by replacing the first and second axis motors 208, 214 with rotatable knobs and an indicator device 120 as disclosed above. It will be further appreciated that other positioning devices controlled by the processor 90 may be used to adjust the position of the laser transmitter 10 without departing from the scope of the present invention. It should be apparent that the first and second axes 94, 98 of the laser transmitter 10 are defined by the configuration of the positioning device 102, 202 as the angular orientation of the laser transmitter 10 with respect to the first and second axes 94, 98 is adjusted by the positioning device 102, 202. It will be appreciated by those skilled in the art that the first and second members may be aligned in such a manner so that the position of the laser transmitter 10 is adjusted without the first and second members being directly aligned with the first and second axes 92, 98, respectively.

The processor 90 is programmed to align the rotating laser beam 12 along the desired plane as defined by the targets 64 as long as the targets 64 are accurately detected. As the targets 64 provide information to the processor 90 as to the desired plane, the accuracy of the alignment algorithm is directly related to the information provided to the processor 90. Extraneous reflections may therefore interfere with the alignment algorithm. For example, as shown in FIG. 14, with the laser transmitter 10 positioned vertically, the target 64 will typically be positioned adjacent a floor surface 300. If the floor surface 300 is shiny, a ghost or mirror image 64' of the target 64 may appear on the floor surface 300. The laser beam 12 may reflect off of the target 64 and the ghost target 64' thereby causing the photodetecting circuit 32 to produce a data signal 72' as shown in FIG. 15A. The processor 90 is therefore not able to distinguish between the real target 64 and the ghost target 64' as the signal 72' includes five distinct regions while the processor 90 expects only three. Further, if there was a gap between the target 64 and the shiny floor surface 300, the photodetecting system 32 would generate two sets of data signals 72' as shown in FIG. 15B which would also confuse the processor 90. Merely processing the first set of data signals 72' may not solve the problem as the laser beam 12 may be reflected from the mirror image target 64' first.

Figure 16:
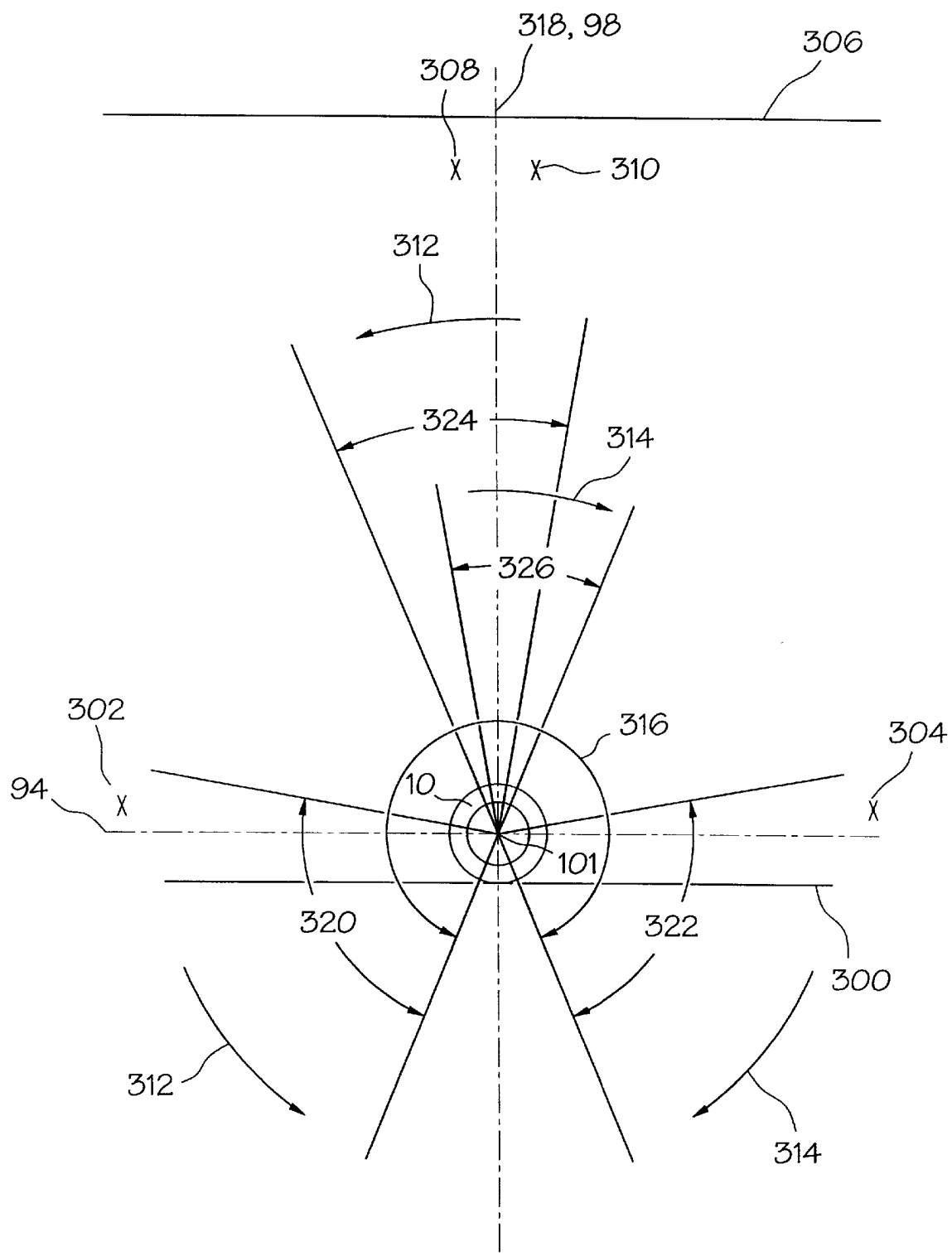
FIG. 16 is a schematic side view of the laser transmitter of FIG. 1 in the vertical mode of operation with a plurality of detection zones.

The processor 90 is programmed to establish detection zones which are associated with a direction of rotation of the laser beam 12 to ensure that the target 64 is swept by the laser beam 12 before hitting a shiny surface. Referring now to FIG. 16, the present invention will be described with the laser transmitter 10 in the vertical mode. In the vertical mode, the laser transmitter 10 is typically positioned substantially adjacent to the floor 300 with the processor 90 expecting to find targets 64 positioned substantially adjacent to the floor 300 near points designated as 302 and 304 or near the ceiling 306 near points designated as 308 and 310. The laser transmitter 10 is arranged so that the laser beam 12 is rotated back and forth in a first angular direction 312 and a second angular direction 314. The laser beam 12 passes back and forth about a rotational arc 316 defined about the central rotational axis 101. The rotational arc 316 is centered about a reference axis 318 which is substantially perpendicular to the central rotational axis 101. The reference axis 318 is also substantially perpendicular to the plane defined by the floor 300. In the illustrated embodiment, the laser transmitter 10 is arranged so that the reference axis 318 is substantially perpendicular to the plane defined by the floor 300 thereby giving the processor 90 a central frame of reference. The relative position of the laser beam 12 may be determined by the rotary encoder 58 and referenced back to the reference axis 318. The rotary signal from the rotary encoder 58 is transmitted to the processor 90 so that the processor 90 may determine the relative position of the laser beam 12 with respect to the reference axis 318 or any other desired reference point. In the illustrated embodiment, the reference axis 318 actually corresponds to the Y-axis 98 when arranged as described above with the X-axis 94 being substantially parallel to the plane defined by the floor 300. However, it should be apparent that the reference axis 318 does not have to be aligned with the Y-axis 98.

As the laser transmitter 10 is positioned substantially adjacent to the floor 300, the rotational arc 316 may be less than 360° as the targets 64 cannot be positioned behind or under the floor 300. In the illustrated embodiment, the rotational arc 316 is approximately 315° centered about the reference axis 318. It will be appreciated by those skilled in the art that the angular arc of the rotational arc 316 may be any reasonable number of degrees depending on the particular application and the arrangement of the laser transmitter 10. In the illustrated embodiment, the processor 90 is programmed to establish four detection zones: a first detection zone 320, a second detection zone 322, a third detection zone 324 and a fourth detection zone 326. The detection zones 320, 322, 324 and 326 are set in response to the rotary position of the laser beam 12 as defined by the rotary encoder 58 and referenced to the reference axis 318. Targets 64 in the first and third detection zones 320 and 324 will only be detected as the laser beam 12 is rotated in the first angular direction 312 so that the laser beam 12 traverses a real target 64 before traversing a shiny surface, such as the floor 300 or the ceiling 306. Similarly, targets 64 in the second and fourth detection zones 322 and 326 will only be detected as the laser beam 12 is rotated in the second angular direction 314. The third and fourth detection zones 324 and 326 overlap for target detection on either side of the reference axis 318. The arcs of the detection zones may be set to any desired and reasonable number of degrees. In the illustrated embodiment, the arcs of the detection zones are at least 10° but less than 90° so that the detection zones do not traverse across two potentially shiny surfaces. Further, the detection zones start at least 10° degrees prior to a potentially shiny surface.

To further help the processor 90 distinguish between true target reflections and ghost target reflections, the target 64 is arranged so that the second non-reflective section 64D is positioned generally adjacent to potentially shiny surfaces. In this manner, the second non-reflective section 64D will be traversed last by the laser beam 12 as the laser beam 12 scans for a target in each of the respective detection zones. While the processor 90 will not be able to precisely distinguish the second non-reflective section 64D, the second non-reflective section 64D provides a deadband area should a ghost target reflection be detected. The deadband area provides a gap between the two sets of signals generated when a true target reflection and a ghost target reflection are detected. As the detection zones are also referenced to the rotational direction of the laser beam 12, any signals generated after a first target signal will be ignored by the processor 90. Once a target 64 has been detected, further reflections in that detection zone will be ignored by the processor 90 until the laser beam 12 reenters the detection zone in the proper direction. Accordingly, true target reflections will be received first by the photodetecting system 32 as the detection zones ensure that the target 64 is scanned by the laser beam 12 before contacting a potentially shiny surface. Further, as the target 64 may only be detected in one rotational direction or the other, a ghost target reflection will be ignored when the laser beam 12 switches direction. The target 64 will be detected in one direction only and ignored as the laser beam 12 sweeps in the other direction scanning for targets 64 in other appropriate detection zones.

While the detection zones 320, 322, 324 and 326 have been described with the laser transmitter 10 in the vertical mode, it will be appreciated by those skilled in the art that the laser transmitter 10 may be positioned in the horizontal mode or other reasonable configuration. Further, the processor 90 may be programmed to establish any reasonable number of detection zones as long as the zones are positioned so that a target 64 is scanned before the laser beam 12 encounters a potentially shiny surface.

The processor 90 is programmed to determine whether a reflection is a valid reflection. The processor determines if the reflection is valid by evaluating the measured widths of the sections 64A, 64B, and 64C as defined by the duration of the time in which the laser beam 12 sweeps across the sections 64A, 64B, and 64C. As the actual widths of the sections 64A, 64B and 64C are known or predetermined, mathematical relationships between the actual widths, i.e. ratios or differences, are also known. Accordingly, the same mathematical relationships between the measured widths may be used to determine if the reflection is valid. Specifically, the reflection is valid if the ratio of the total pulse to the deadband period approximately equals six (6). In the illustrated embodiment, the total width of the target 64, excluding the second non-reflective section 64D, is six inches and the first non-reflective section 64B is one inch. It should be apparent that other dimensions and methods may be used to determine if a valid reflection has occurred. It will be appreciated by those skilled in the art that other ratios or mathematical relationships may be used to determine if the reflection is valid. Once a valid target reflection has been received, the processor 90 may adjust the orientation of the rotating laser beam 12 so that it defines the desired plane.

The length of time it takes to adjust the rotating laser beam 12 to the desired plane is directly proportional to the rate at which the laser beam 12 is swept across the target 64. The rate may be increased by dithering the laser beam 12 across the target 64. The laser beam 12 is dithered by sweeping the laser beam 12 back and forth across the target 64 once the target 64 is detected, reversing the direction of the beam rotation after each sweep of the target 64. More data is transmitted to the photodetecting system 32 by this technique since the laser beam 12 does not have to rotate a full 360 degrees or the set number of degrees of the rotational arc 316. The amount of data transmitted to the photodetecting system 32 increases without having to increase the rotational speed of the pentaprism 54. However, it will be appreciated by those skilled in the art that the rotational speed of the pentaprism 54 may be reasonably increased to reduce adjustment time, as well. The laser beam 12 may also be dithered across two targets 64 with the laser beam 12 reversing direction after both targets 64 are detected.

The plane lock routine of the present invention is similar to the plane lock routine described in detail in copending application, U.S. patent application Ser. No. 08/833,978, SYSTEM FOR ADJUSTING THE ORIENTATION OF A PLANE OF LASER LIGHT, filed Apr. 11, 1997, by Detweiler et al., herein incorporated by reference. The plane lock routine of the present invention will be described with respect to the flowchart in FIG. 17 and based on the detection zones 320, 322, 324 and 326 shown in FIG. 16. Additional programming details are available in the above application. In block 400, the plane lock routine is activated. In block 402, the program disables reception of reflected target signals to prevent the reception of reflections prior to initialization of the hardware and software. Once the reception of target signals has been disabled, the program modulates the laser beam 12 in block 404 and initializes the hardware and software as described in the copending application, Ser. No. 08/833,978. In block 406, the program starts the plane lock dither zone which sets the angular arc of the rotational arc 316. The dither zone is set based on the configuration of the laser transmitter 10 and the desired application, i.e. vertical or horizontal mode. In the illustrated embodiment of FIG. 16 with the laser transmitter 10 in the vertical mode, the dither zone is set to 315° centered around the reference axis 318.

In decision box 408, the program determines if a reflection has been detected. If a reflection has been detected, the program disables reception of further target reflections in box 410 so that the processor 90 may process the detected signal and ignore possible ghost target reflections. The processor 90 analyzes the detected signal to determine if the reflection was generated from a valid target in decision box 412. If the target is not a valid target, the program enables the reception or detection of target signals in block 414 and returns the program to decision block 408. If the target is a valid target, the program runs the grade control algorithm to center the laser beam 12 on the target in block 416. The grade control algorithm is described in detail in the copending application, Ser. No. 08/833,978.

If a reflection has not been detected in decision block 408, the program determines the position of the rotating laser beam 12 with respect to the reference axis 318 and the X-axis 94, and hence, the detection zones 320, 322, 324 and 326, to determine if the laser beam 12 is in position to detect a target. The position of the rotating laser beam 12 is determined using the rotary encoder 58 as described above. In decision block 418, the program determines if the laser beam 12 is at the end of the dither zone. If the laser beam 12 is at the end of the dither zone, the program disables reception of target signals in block 420 as the laser beam 12 will be changing direction. It will be appreciated by those skilled in the art that the program may be set-up so as to disable reception of target signals before the laser beam 12 reaches the end of the dither zone. A true target reflection should not be present when the laser beam 12 changes direction as the laser beam 12 is scanning back over potentially shiny surfaces prior to intercepting a possible target in the detection zone. If the laser beam 12 is not at the end of the dither zone, the program determines if the laser beam 12 is exiting the reference axis 318/Y-axis 98 area in decision block 422. If the laser beam 12 is exiting the reference axis 318/Y-axis 98 area, the program disables reception of target signals in block 420 since the laser beam 12 is exiting either the third or fourth detection zones 324, 326. If the laser beam 12 is not exiting the reference axis 318/Y-axis 98 area, the program determines if the laser beam 12 is entering the reference axis 318/Y-axis 98 area in decision block 424.

If the laser beam 12 is entering the reference axis 318/Y-axis 98 area, and hence, the third or fourth detection zones 324, 326, the program enables reception of target signals in block 426 as a true target reflection may be encountered. If the laser beam 12 is not entering the reference axis 318/Y-axis 98 area, the program determines if the laser beam 12 is entering the positive X-axis area in decision block 428. If the laser beam 12 is entering the positive X-axis area, and hence, the second detection zone 322, the program enables reception of target signals in block 426. If the laser beam 12 is not entering the positive X-axis area, the program determines if the laser beam 12 is entering the negative X-axis area in decision block 430. If the laser beam 12 is entering the negative X-axis area, and hence, the first detection zone 320, the program enables reception of target signals in block 426. After blocks 420, 426 and 430, the program also returns to decision block 408 to wait for a target reflection and potential processing thereafter as described above. It will be appreciated by those skilled in the art that the program described with respect to FIG. 17 may be changed based on the arrangement of the laser transmitter 10, the particular application, the number of established detection zones and the positions of the established detection zones.

In the illustrated embodiment, the slope of the non-reflective section 64B in the second target region 64F is approximately 45 degrees. It will be appreciated by those skilled in the art that the slope may be greater or less than 45 degrees. A slope which approaches the horizontal or zero degrees will increase the gain and sensitivity of the system. Conversely, a slope which approaches the vertical or ninety degrees will decrease the gain and sensitivity of the system. It should be apparent that the illustrated embodiment is digitally based. However, it will be appreciated by those skilled in the art that an analog based system with asynchronous components may be used without departing from the scope of the present invention.

Having described the invention in detail and by reference to preferred embodiments thereof, it will be apparent that modifications and variations are possible without departing from the scope of the invention defined in the appended claims.

What is claimed is:

1. A process for transmitting a laser beam comprising the steps of:

moving said laser beam in at least a first angular direction along a rotational arc defined about a central rotational axis;

monitoring a rotary position of said laser beam relative to said rotational arc;

establishing at least a first detection zone along said rotational arc based on said rotary position of said laser beam as said laser beam moves in said first angular direction, said first detection zone being less than 90 degrees; and detecting a reflected laser beam from at least a first target positioned within said rotational arc and in said first detection zone as said laser beam is moved in said first angular direction.

2. The process of claim 1, wherein said rotational arc is greater than 180 degrees and less than 360 degrees and centered about a reference axis, said reference axis being substantially perpendicular to said central rotational axis.

3. The process of claim 1, wherein said first target comprises a plurality of reflective sections and a plurality of non-reflective sections, respective ones of said plurality of reflective sections alternating in position with respective ones of said plurality of non-reflective sections, one of said plurality of non-reflective sections being positioned so that said one non-reflective section is traversed last by said laser beam as said laser beam moves in said first angular direction.

4. The process of claim 1, wherein said first target comprises a first reflective section, a second reflective section, a first non-reflective section and a second non-reflective section, said first and second reflective sections alternating in position with said first and second non-reflective sections, respectively, with said second non-reflective section forming an edge of said first target, and wherein said first non-reflective section includes a portion which slopes across said first and second reflective sections.

5. The process of claim 1, further comprising the step of determining whether said reflected laser beam corresponds to a valid target.

6. The process of claim 1, further comprising the step of ignoring said reflected laser beam after said laser beam is reflected from said first target.

7. A process for transmitting a laser beam comprising the steps of:

moving said laser beam back and forth in a first angular direction and a second angular direction along a rotational arc defined about a central rotational axis;

monitoring a rotary position of said laser beam relative to said rotational arc;

establishing a plurality of detection zones along said rotational arc based on said rotary position of said laser beam, each of said detection zones being less than 90 degrees;

detecting a reflected laser beam from at least a first target positioned within said rotational arc and in one of said plurality of detection zones;

wherein said plurality of detection zones includes at least a first detection zone and at least a second detection zone, said reflected laser beam being detected from said first target positioned in said first detection zone only when said laser beam is moved in said first angular direction and said reflected laser beam being detected from said first target positioned in said second detection zone only when said laser beam is moved in said second angular direction.

8. The process of claim 7, further comprising the step of detecting said reflected laser beam from a second target positioned within said rotational arc and in another of said plurality of detection zones.

9. The process of claim 7, wherein said plurality of detection zones includes a third detection zone, said reflected laser beam being detected from said first target positioned in said third detection zone only when said laser beam is moved in said first angular direction.

10. The process of claim 9, wherein said plurality of detection zones includes a fourth detection zone, said reflected laser beam being detected from said first target positioned in said fourth detection zone only when said laser beam is moved in said second angular direction.

11. The process of claim 10, wherein at least one of said first and third detection zones overlaps with at least one of said second and fourth detection zones.

12. The process of claim 7, wherein at least one of said plurality of detection zones is approximately 10 degrees.

13. The process of claim 7, further comprising the step of ignoring said reflected laser beam after said laser beam is reflected from said first target.

14. The process of claim 7, wherein said rotational arc is greater than 180 degrees and less than 360 degrees and centered about a reference axis, said reference axis being substantially perpendicular to said central rotational axis.

15. The process of claim 7, wherein said first target comprises a plurality of reflective sections and a plurality of non-reflective sections, respective ones of said plurality of reflective sections alternating in position with respective ones of said plurality of non-reflective sections, one of said plurality of non-reflective sections being positioned so that said one non-reflective section is traversed last by said laser beam as said laser beam moves in said first angular direction with said first target positioned in said first detection zone or positioned so that said one non-reflective section is traversed last as said laser beam moves in said second angular direction with said first target positioned in said second detection zone.

16. The process of claim 7, wherein said first target comprises a first reflective section, a second reflective section, a first non-reflective section and a second non-reflective section, said first and second reflective sections alternating in position with said first and second non-reflective sections, respectively, with said second non-reflective section forming an edge of said first target, and wherein said first non-reflective section includes a portion which slopes across said first and second reflective sections.

17. The process of claim 7, further comprising the step of determining whether said reflected laser beam corresponds to a valid target.

18. A process for adjusting the orientation of a plane in which a laser beam is moved, said process comprising the steps of:

moving said laser beam in at least a first angular direction along a rotational arc defined about a central rotational axis thereby defining a plane through which said laser beam is projected;

monitoring a rotary position of said laser beam relative to said rotational arc;

establishing at least a first detection zone along said rotational arc based on said rotary position of said laser beam as said laser beam moves in said first angular direction, said first detection zone being less than 90 degrees;

detecting a reflected laser beam from at least a first target positioned within said rotational arc and in said first detection zone as said laser beam is moved in said first angular direction;

generating a first signal having a first waveform representative of said reflected laser beam from said first target; and adjusting the orientation of said plane in response to said first signal.

19. The process of claim 18, wherein said rotational arc is greater than 180 degrees and less than 360 degrees and centered about a reference axis, said reference axis being substantially perpendicular to said central rotational axis.

20. The process of claim 18, wherein said first target comprises a plurality of reflective sections and a plurality of non-reflective sections, respective ones of said plurality of reflective sections alternating in position with respective ones of said plurality of non-reflective sections, one of said plurality of non-reflective sections being positioned so that said one non-reflective section is traversed last by said laser beam as said laser beam moves in said first angular direction.

21. The process of claim 18, wherein said first target comprises a first reflective section, a second reflective section, a first non-reflective section and a second non-reflective section, said first and second reflective sections alternating in position with said first and second non-reflective sections, respectively, with said second non-reflective section forming an edge of said first target, and wherein said first non-reflective section includes a portion which slopes across said first and second reflective sections.

22. The process of claim 18, further comprising the step of determining whether said reflected laser beam corresponds to a valid target.

23. The process of claim 18, further comprising the step of ignoring said reflected laser beam after said laser beam is reflected from said first target.

24. A process for adjusting the orientation of a plane in which a laser beam is moved, said process comprising the steps of:

moving said laser beam back and forth in a first angular direction and a second angular direction along a rotational arc defined about a central rotational axis thereby defining a plane through which said laser beam is projected;

monitoring a rotary position of said laser beam relative to said rotational arc;

establishing a plurality of detection zones along said rotational arc based on said rotary position of said laser beam, each of said detection zones being less than 90 degrees;

detecting a reflected laser beam from at least a first target positioned within said rotational arc and in one of said plurality of detection zones;

generating a first signal having a first waveform representative of said reflected laser beam from said first target; and adjusting the orientation of said plane in response to said first signal;

wherein said plurality of detection zones includes at least a first detection zone and at least a second detection zone, said reflected laser beam being detected from said first target positioned in said first detection zone only when said laser beam is moved in said first angular direction and said reflected laser beam being detected from said first target positioned in said second detection zone only when said laser beam is moved in said second angular direction.

25. The process of claim 24, further comprising the step of detecting said reflected laser beam from a second target positioned within said rotational arc and in another said plurality of detection zones.

26. The process of claim 24, wherein said plurality of detection zones includes a third detection zone, said reflected laser beam being detected from said first target positioned in said third detection zone only when said laser beam is moved in said first angular direction.

27. The process of claim 26, wherein said plurality of detection zones includes a fourth detection zone, said reflected laser beam being detected from said first target positioned in said fourth detection zone only when said laser beam is moved in said second angular direction.

28. The process of claim 27, wherein at least one of said first and third detection zones overlaps with at least one of said second and fourth detection zones.

29. The process of claim 24, wherein at least one of said plurality of detection zones is approximately 10 degrees.

30. The process of claim 24, further comprising the step of ignoring said reflected laser beam after said laser beam is reflected from said first target.

31. The process of claim 24, wherein said rotational arc is greater than 180 degrees and less than 360 degrees and centered about a reference axis, said reference axis being substantially perpendicular to said central rotational axis.

32. The process of claim 24, wherein said first target comprises a plurality of reflective sections and a plurality of non-reflective sections, respective ones of said plurality of reflective sections alternating in position with respective ones of said plurality of non-reflective sections, one of said plurality of non-reflective sections being positioned so that said one non-reflective section is traversed last by said laser beam as said laser beam moves in said first angular direction with said first target positioned in said first detection zone or positioned so that said one non-reflective section is traversed last as said laser beam moves in said second angular direction with said first target positioned in said second detection zone.

33. The process of claim 24, wherein said first target comprises a first reflective section, a second reflective section, a first non-reflective section and a second non-reflective section, said first and second reflective sections alternating in position with said first and second non-reflective sections, respectively, with said second non-reflective section forming an edge of said first target, and wherein said first non-reflective section includes a portion which slopes across said first and second reflective sections.

34. The process of claim 24, further comprising the step of determining whether said reflected laser beam corresponds to a valid target.

35. A laser transmitter comprising:

a photodetecting system receiving a reflected laser beam and generating a first signal having a first waveform representative of said reflected laser beam;

an optical system arranged to generate a laser beam and to direct said reflected laser beam to said photodetecting system, said optical system projecting said laser beam radially in at least a first angular direction along a rotational arc defined about a central rotational axis thereby defining a plane through which said laser beam is projected;

a positioning device coupled to said optical system, said positioning device including a first member and a second member for adjusting an angular orientation of said optical system with respect to a first axis and with respect to a second axis;

a rotary encoder arranged to produce a rotary signal indicative of a rotary position of said laser beam relative to said rotational arc; and a processor responsive to receive said first signal and said rotary signal and programmed to:
establish at least a first detection zone along said rotational arc in response to said rotary signal as said laser beam moves in said first angular direction, said first detection zone being less than 90 degrees;
identify a target position in said first detection zone only as said laser beam moves in said first angular direction and in response to said first signal;
control at least one of said first and second members of said positioning device in response to said target position thereby adjusting said plane through which said laser beam is projected.

36. The laser transmitter of claim 35, wherein said rotational arc is greater than 180 degrees and less than 360 degrees and centered about a reference axis, said reference axis being substantially perpendicular to said central rotational axis.

37. The laser transmitter of claim 35, wherein said processor is further programmed to determine whether said reflected laser beam corresponds to a valid target position.

38. The laser transmitter of claim 35, wherein said processor is further programmed to ignore a portion of said first signal received in said first detection zone with said laser beam moving in said first angular direction after a valid target position has been determined by said processor.

39. A laser transmitter comprising:

a photodetecting system receiving a reflected laser beam and generating a first signal having a first waveform representative of said reflected laser beam;

an optical system arranged to generate a laser beam and to direct said reflected laser beam to said photodetecting system, said optical system projecting said laser beam radially back and forth in a first angular direction and a second angular direction along a rotational arc defined about a central rotational axis thereby defining a plane through which said laser beam is projected;

a positioning device coupled to said optical system, said positioning device including a first member and a second member for adjusting an angular orientation of said optical system with respect to a first axis and with respect to a second axis;

a rotary encoder arranged to produce a rotary signal indicative of a rotary position of said laser beam relative to said rotational arc; and a processor responsive to receive said first signal and said rotary signal and programmed to:

establish a plurality of detection zones along said rotational arc, each of said plurality of detection zones being less than 90 degrees and associated with one of said first and second angular directions of said laser beam, at least one of said plurality of detection zones being associated with said first angular direction of said laser beam and another of said plurality of detection zones being associated with said second angular direction of said laser beam;

identify a target position in at least one of said plurality of detection zones in response to said first signal, said target position being identified in each of said plurality of detection zones only as said laser beam moves in the angular direction associated with each respective detection zone; and control at least one of said first and second members of said positioning device in response to said target position thereby adjusting said plane through which said laser beam is projected.

40. The laser transmitter of claim 39, wherein said processor is further programmed to identify another target position in another of said plurality of detection zones in response to said first signal.

41. The laser transmitter of claim 39, wherein said plurality of detection zones includes at least a first detection zone and at least a second detection zone, said processor being programmed to identify said target position in said first detection zone in response to said first signal only as said laser beam moves in said first angular direction and in said second detection zone in response to said first signal only as said laser beam moves in said second angular direction.

42. The laser transmitter of claim 41, wherein said plurality of detection zones includes a third detection zone, said processor being further programmed to identify said target position in said third detection zone in response to said first signal only as said laser beam moves in said first angular direction.

43. The laser transmitter of claim 42, wherein said plurality of detection zones includes a fourth detection zone, said processor being further programmed to identify said target position in said fourth detection zone in response to said first signal only as said laser beam moves in said second angular direction.

44. The laser transmitter of claim 43, wherein at least one of said first and third detection zones overlaps with at least one of said second and fourth detection zones.

45. The laser transmitter of claim 40, wherein at least one of said plurality of detection zones is approximately 10 degrees.

46. The laser transmitter of claim 40, wherein said processor is further programmed to ignore a portion of said first signal received from said target position in one of said plurality of detection zones after a valid target position has been determined by said processor.

47. The laser transmitter of claim 40, wherein said rotational arc is greater than 180 degrees and less than 360 degrees and centered about a reference axis, said reference axis being substantially perpendicular to said central rotational axis.

48. The laser transmitter of claim 40, wherein said processor is further programmed to determine whether said reflected laser beam corresponds to a valid target position.

49. A laser transmitting system comprising:

at least a first target comprising a plurality of reflective sections and a plurality of non-reflective sections, respective ones of said plurality of reflective sections alternating in position with respective ones of said plurality of non-reflective sections;

a photodetecting system receiving a reflected laser beam and generating a first signal having a first waveform representative of said reflected laser beam;

an optical system arranged to generate a laser beam and to direct said reflected laser beam from said first target to said photodetecting system, said optical system projecting said laser beam radially in at least a first angular direction along a rotational arc defined about a central rotational axis thereby defining a plane through which said laser beam is projected;

a positioning device coupled to said optical system, said positioning device including a first member and a second member for adjusting an angular orientation of said optical system with respect to a first axis and with respect to a second axis;

a rotary encoder arranged to produce a rotary signal indicative of a rotary position of said laser beam relative to said rotational arc; and a processor responsive to receive said first signal and said rotary signal and programmed to:

establish at least a first detection zone along said rotational arc in response to said rotary signal as said laser beam moves in said first angular direction, said first detection zone being less than 90 degrees;

identify said first target positioned in said first detection zones only as said laser beam moves in said first angular direction and in response to said first signal;

control at least one of said first and second members of said positioning device in response to said first signal thereby adjusting said plane through which said laser beam is projected.

50. The laser transmitting system of claim 49, wherein said rotational arc is greater than 180 degrees and less than 360 degrees and centered about a reference axis, said reference axis being substantially perpendicular to said central rotational axis.

51. The laser transmitting system of claim 49, wherein said processor is further programmed to determine whether said reflected laser beam corresponds to a valid target.

52. The laser transmitting system of claim 49, wherein said processor is further programmed to ignore a portion of said first signal received in one of said detection zones after a valid target has been identified by said processor.

53. The laser transmitting system of claim 49, wherein one of said plurality of non-reflective sections is positioned so that said one non-reflective section is traversed last by said laser beam as said laser beam moves in said first angular direction.

54. The laser transmitting system of claim 49, wherein said plurality of non-reflective sections includes another non-reflective section having a portion which slopes across two of said reflective sections.

55. A laser transmitting system comprising:
- at least a first target comprising a plurality of reflective sections and a plurality of non-reflective sections, respective ones of said plurality of reflective sections alternating in position with respective ones of said plurality of non-reflective sections;
- a photodetecting system receiving a reflected laser beam and generating a first signal having a first waveform representative of said reflected laser beam;
- an optical system arranged to generate a laser beam and to direct said reflected laser beam from said first target to said photodetecting system, said optical system projecting said laser beam radially back and forth in a first angular direction and a second angular direction along a rotational arc defined about a central rotational axis thereby defining a plane through which said laser beam is projected;
- a positioning device coupled to said optical system, said positioning device including a first member and a second member for adjusting an angular orientation of said optical system with respect to a first axis and with respect to a second axis;
- a rotary encoder arranged to produce a rotary signal indicative of a rotary position of said laser beam relative to said rotational arc; and
- a processor responsive to receive said first signal and said rotary signal and programmed to:
  - establish a plurality of detection zones along said rotational arc, each of said detection zones being less than 90 degrees and associated with one of said first and second angular directions of said laser beam, at least one of said plurality of detection zones being associated with said first angular direction of said laser beam and another of said plurality of detection zones being associated with said second angular direction of said laser beam;
  - identify said first target in one of said plurality of detection zones in response to said first signal only as said laser beam moves in the angular direction associated with each respective detection zone; and
  - control at least one of said first and second members of said positioning device in response to said first signal thereby adjusting said plane through which said laser beam is projected.

56. The laser transmitting system of claim 55, wherein said processor is further programmed to identify a second target in another of said plurality of detection zones in response to said first signal.

57. The laser transmitting system of claim 55, wherein said plurality of detection zones includes at least a first detection zone and at least a second detection zone, said processor being programmed to identify said first target in said first detection zone in response to said first signal only as said laser beam moves in said first angular direction and in said second detection zone in response to said first signal only as said laser beam moves in said second angular direction.

58. The laser transmitting system of claim 57, wherein said plurality of detection zones includes a third detection zone, said processor being programmed to identify said first target in said third detection zone in response to said first signal only as said laser beam moves in said first angular direction.

59. The laser transmitting system of claim 58, wherein said plurality of detection zones includes a fourth detection zone, said processor being programmed to identify said first target in said fourth detection zone in response to said first signal only as said laser beam moves in said second angular direction.

60. The laser transmitting system of claim 59, wherein at least one of said first and third detection zones overlaps with at least one of said second and fourth detection zones.

61. The laser transmitting system of claim 55, wherein at least one of said plurality of detection zones is approximately 10 degrees.

62. The laser transmitting system of claim 55, wherein said processor is further programmed to ignore a portion of said first signal received in one of said plurality of detection zones after a valid target has been identified by said processor.

63. The laser transmitting system of claim 55, wherein said rotational arc is greater than 180 degrees and less than 360 degrees and centered about a reference axis, said reference axis being substantially perpendicular to said central rotational axis.

64. The laser transmitting system of claim 55, wherein said processor is further programmed to determine whether said reflected laser beam corresponds to a valid target.

65. The laser transmitting system of claim 55, wherein one of said plurality of non-reflective sections is positioned so that said one non-reflective section is traversed last by said laser beam as said laser beam scans said first target in one of said plurality of detection zones and in the angular direction associated with the respective detection zone.

66. The laser transmitting system of claim 55, wherein said plurality of non-reflective sections includes another non-reflective section having a portion which slopes across two of said reflective sections.

* * * * *